United States Patent
Thomas et al.

(10) Patent No.: US 7,923,108 B2
(45) Date of Patent: *Apr. 12, 2011

(54) BUILT-UP ROOFING SURFACING SHEETS AND METHODS OF MANUFACTURE

(75) Inventors: Daron J. Thomas, Bakersfield, CA (US); Randy Raines, Bakersfield, CA (US); John Hinds, Bakersfield, CA (US)

(73) Assignee: Consolidated Fiberglass Products Company, Bakersfield, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/464,717

(22) Filed: May 12, 2009

(65) Prior Publication Data
US 2009/0280320 A1 Nov. 12, 2009

Related U.S. Application Data

(60) Provisional application No. 61/052,440, filed on May 12, 2008, provisional application No. 61/087,587, filed on Aug. 8, 2008.

(51) Int. Cl.
*B32B 17/02* (2006.01)
*B32B 15/09* (2006.01)
*B32B 17/10* (2006.01)
*B32B 15/12* (2006.01)
*B32B 37/00* (2006.01)

(52) U.S. Cl. ........ 428/336; 428/334; 428/335; 428/339; 428/340; 428/430; 428/458; 156/310

(58) Field of Classification Search .................. None
See application file for complete search history.

(56) References Cited

U.S. PATENT DOCUMENTS

| | | | |
|---|---|---|---|
| 4,396,665 A | 8/1983 | Rowe | |
| 4,472,243 A * | 9/1984 | Bondoc et al. | 162/135 |
| 4,473,610 A | 9/1984 | Davis | |
| 5,096,759 A | 3/1992 | Simpson et al. | |
| 6,296,912 B1 | 10/2001 | Zickell | |
| 6,531,200 B2 | 3/2003 | Zickell et al. | |
| 7,070,844 B2 | 7/2006 | Bartek | |
| 7,179,761 B2 * | 2/2007 | Malik et al. | 442/20 |

(Continued)

FOREIGN PATENT DOCUMENTS
WO   WO 2007/126997 A1   11/2007

OTHER PUBLICATIONS

Tamko Roofing Products, Inc., TAMKO TW FLASH-N-WRAP-40 Self Adhering Reflective Sheet Membrane, Apr. 2006 (Estimate), 2 pages.

*Primary Examiner* — D. Lawrence Tarazano
*Assistant Examiner* — Camie S Thompson
(74) *Attorney, Agent, or Firm* — Jon Hokanson; Lewis Brisbois Bisgaard & Smith LLP

(57) ABSTRACT

Built-up roofing surfacing sheets that include a white, resin coated aluminum foil adhered to one side of an asphalt-impregnated fiberglass mat and sand adhered to the other side of the asphalt-impregnated fiberglass mat, the surfacing sheet being compliant with the requirements of California Code of Regulations, Title 24 in effect as of Sep. 11, 2006, and methods of manufacturing the built-up roofing surfacing sheets.

13 Claims, 22 Drawing Sheets

U.S. PATENT DOCUMENTS

| | | | |
|---|---|---|---|
| 2004/0009319 A1* | 1/2004 | Zanchetta et al. | 428/40.1 |
| 2004/0013854 A1 | 1/2004 | Zanchetta et al. | |
| 2004/0081789 A1 | 4/2004 | Kim | |
| 2004/0172908 A1 | 9/2004 | Swann | |
| 2004/0261347 A1 | 12/2004 | Hageman | |
| 2005/0257469 A1 | 11/2005 | Bennett et al. | |
| 2009/0297834 A1* | 12/2009 | Thomas et al. | 428/335 |

* cited by examiner

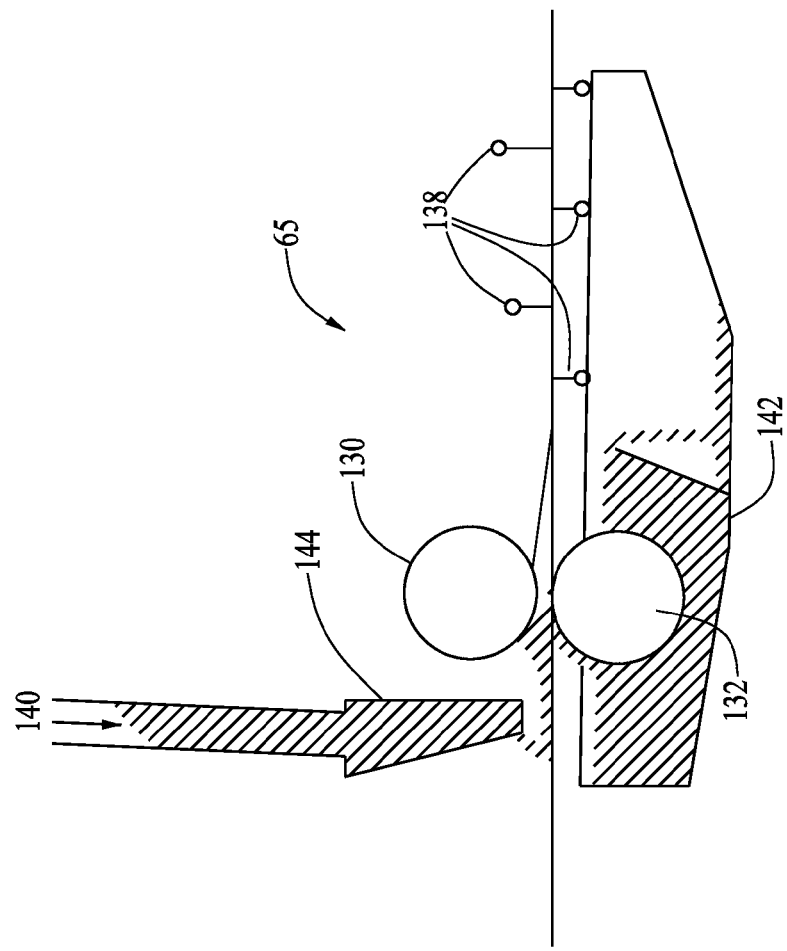
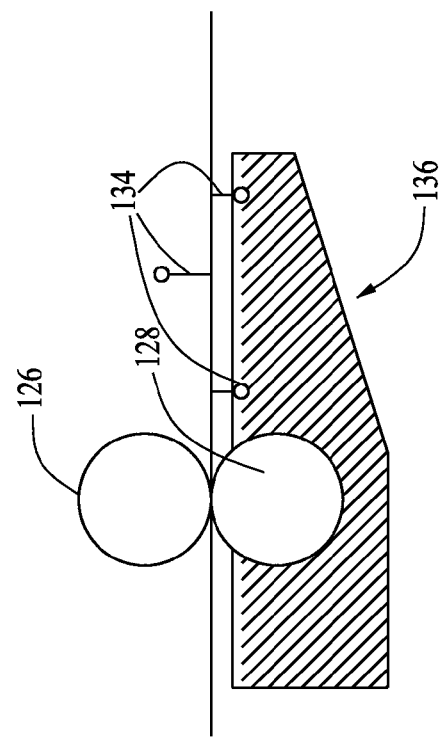

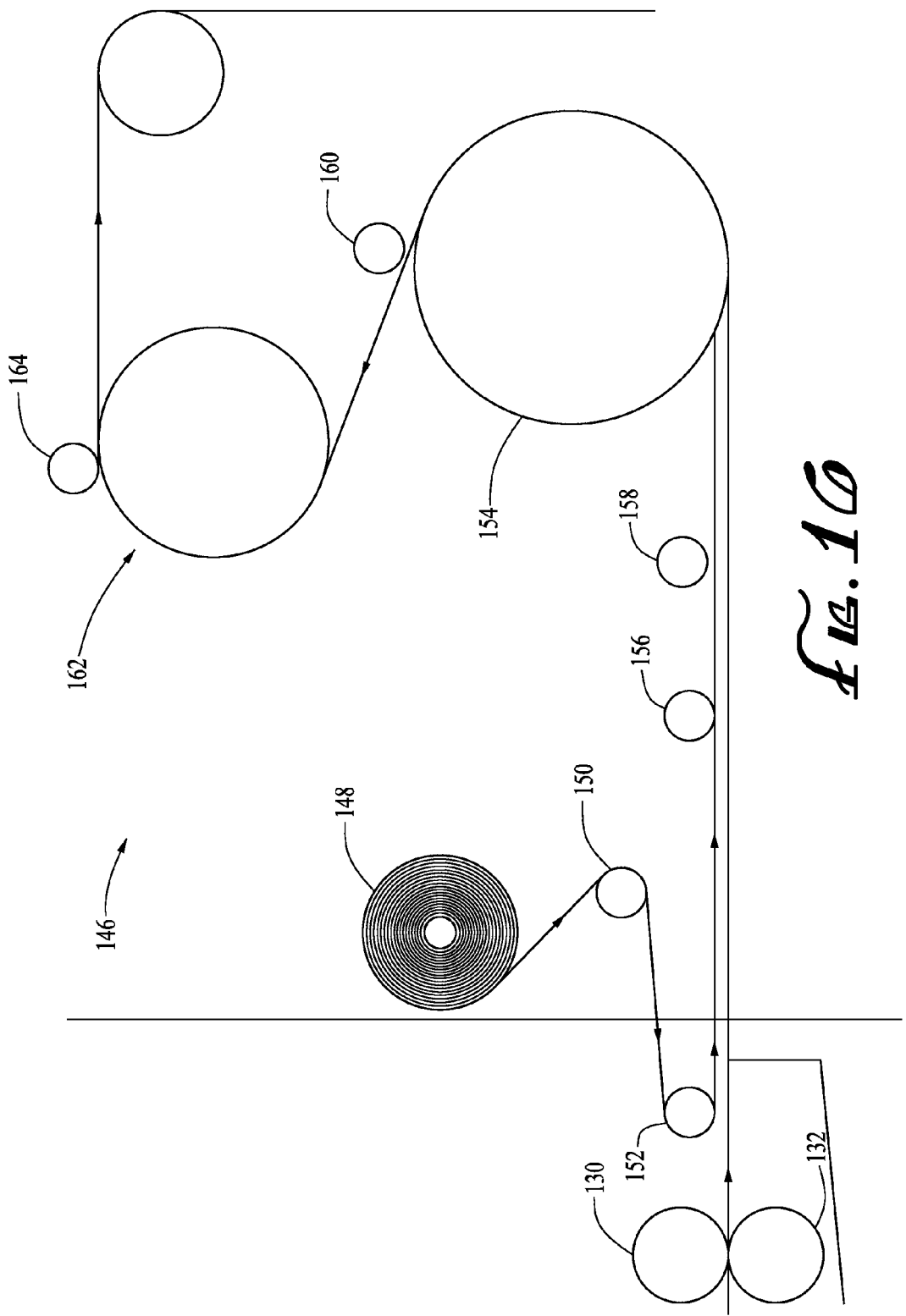

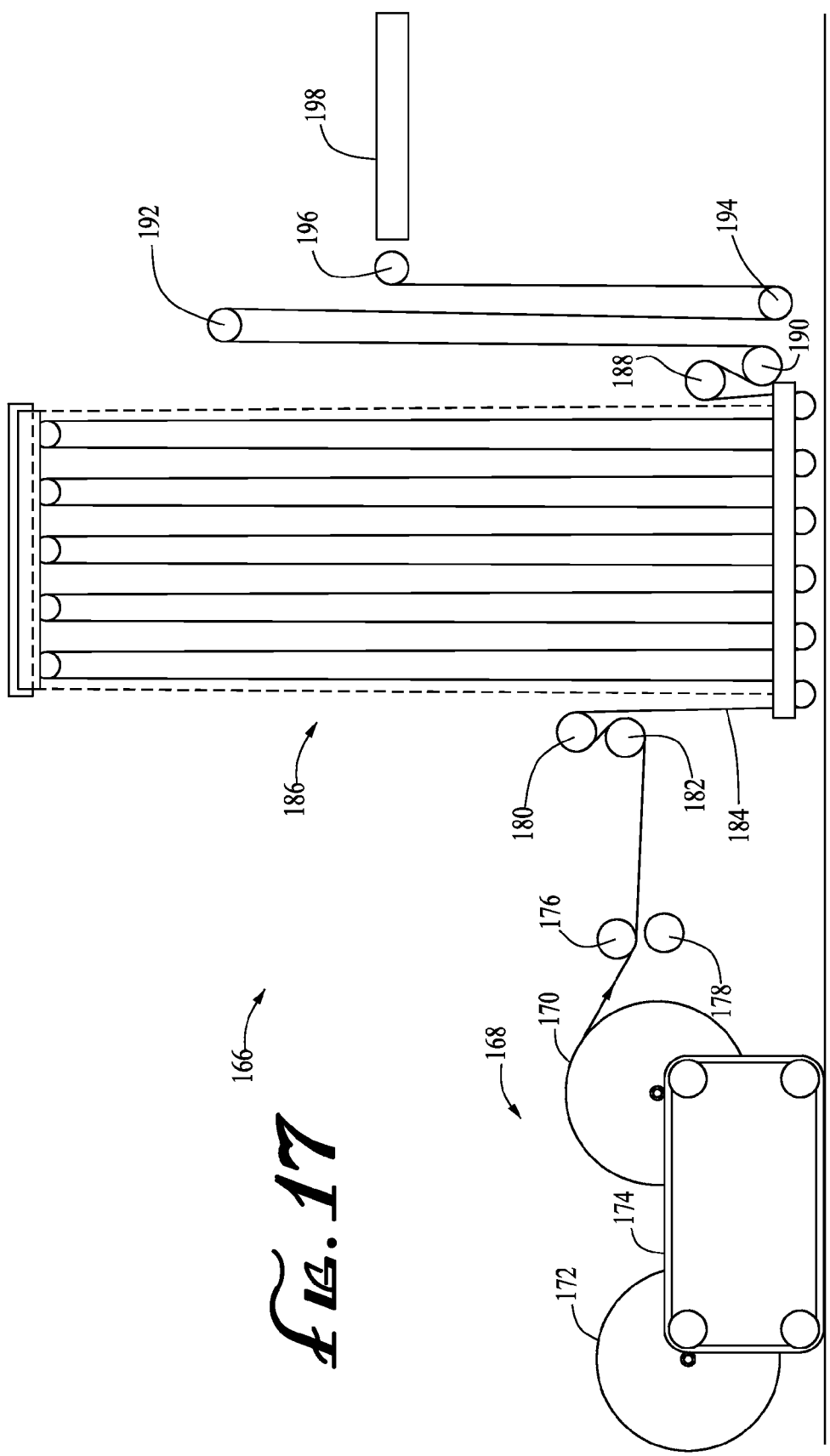

BUILT-UP ROOFING SURFACING SHEETS AND METHODS OF MANUFACTURE

CROSS REFERENCE TO RELATED APPLICATIONS

This application is a utility patent application based on, incorporates by reference and claims the benefit of priority of U.S. provisional patent application 61/052,440, filed May 12, 2008, and U.S. provisional patent application 61/087,587, filed Aug. 8, 2008.

FIELD OF INVENTION

Roofing surfacing sheets, generally referred to in the roofing industry as built-up roofing surfacing ("BUR") sheets, and the manufacturing of novel, finished BUR surfacing sheets that use a white resin-coated foil adhered to a mat-type substrate.

BACKGROUND OF INVENTION

Conventional, Modified Bitumen ("MB") or APP (torch applied) roofing surfacing sheets, also known as BUR surfacing sheets, are well known products in the roofing industry, and are commonly referred to as "cap sheets". MB cap sheets use a modified-asphalt that includes rubber polymer modifier. While a MB cap sheet is more expensive than a conventional BUR or APP cap sheet it provides a much longer life for the installed roofing system. All these cap sheets have been in production and general use for over forty (40) years. The BUR products, such as cap sheets are in contrast to other roofing surfaces commonly referred to as single ply surfacing sheets. Conventional, MB and APP cap sheets are relatively inexpensive products that combine a non-woven (usually fiberglass) mat, an asphalt coating and mineral surface ceramic coated granules to produce a surfacing sheet used in built-up roofing applications.

With the passage of California's Title 24 and the increasing importance for energy conservation a variety of white coated cap sheets have been introduced into the roofing marketplace. The State of California has certain requirements for roofing materials, set forth in the California Code of Regulations, Title 24 (as amended, most recently effective as of Sep. 11, 2006) ("Title 24"). Title 24 requires that an energy-efficient surface be applied on certain new roofs as well as on certain replacement roofs based upon spelled out guidelines and criteria within the legislation. Initial Solar Reflectivity ("SR") must be 70% or greater. Initial Thermal Emmitance ("TE") must be 75% or greater. Conventional Title 24 compliant white coated cap sheets weigh approximately 75-90 pounds per one (1) square roll and have many disadvantages. The coated surfaces of these conventional products have many irregularities and voids that are caused by coating over a granule surface. The coatings themselves have a useful life of two-three (2-3) years, after which a new coating must be applied in order for theses conventional products to continue to perform as originally intended. Conventional caps sheets are typically produced in units of one (1) square roll, in which 1 square equals 100 square feet, and with each square roll weighing approximately 75-90 pounds.

SUMMARY

The present inventive surfacing sheets typically weigh less than one-half (½) the weight of the cap sheet products in the market place today. The current inventive surfacing sheets have a smooth surface with essentially no irregularities, and their surfaces are believed to last up to about ten (10) years without the need for re-coating or re-surfacing. The present inventive surfacing sheets preferably include a non-woven fiberglass mat, an asphalt coating on the top side of the mat, an aluminum foil adhered on its bottom side to the top side of the asphalt coated mat and adhered to a white acrylic coating on its top side, and a sand coating on the bottom side of the asphalt coated mat.

The most preferred non-woven mat component of the surfacing sheets is a fiberglass mat manufactured by Consolidated Fiberglass Products Co. (Conglas) using Owens-Corning or John's Manville wet chop fiberglass reinforcements. The preferred non-woven fiberglass mat may also be manufactured by Owens-Corning or Johns-Manville. The most preferred asphalt used to coat the mat is produced by an air-blown process and is available from Ridgeline Oil and Asphalt Co. Essentially the same asphalt coatings are available from LTR Asphalt or ALON Refining. The most preferred white resin coated aluminum foil is manufactured in various sizes, weights and thicknesses (typically in mils) and is available from Cleveland Laminating Corp., Cleveland, Ohio. The most preferred white acrylic coating is manufactured by and available from Rohm and Haas Co. One alternate embodiment includes a PET film on the bottom side of the aluminum foil, that is, between the aluminum foil and the asphalt-impregnated fiberglass mat. Yet another alternate embodiment includes a sheet of paper on the bottom side of the aluminum foil, that is, between the aluminum foil and the asphalt-impregnated fiberglass mat.

One object of the current inventive sheets is to supply a product that is superior to BUR surfacing sheet products currently available and that are Title 24 compliant.

Another object of the current inventive surfacing sheets is that the finished products weigh less than one-half (½) the weight of the presently commercial Title 24-compliant product available in the market place. The current inventive finished products weigh between 15-45 pounds per square which allows them to be produced in a two (2) square roll as opposed to current Title 24 product in the marketplace which weighs between 75-90 pounds per square and has to be produced and packaged in a one (1) square roll. Another advantage of a two-(2) square roll is that it is easier to load the product onto the roof and it is much lighter and easier for the roofer to handle and is less labor intensive during application to the roof.

Another advantage of the currently inventive surfacing sheets is that the roofing contractor and building products distributor can transport more product for lower freight costs.

Another object of the current inventive sheets is to provide an even surface on the roof without the irregularities of the currently available Title 24-compliant white coated cap sheets. The even surface of the current inventive sheets do not capture and hold dirt and grime as do the currently available Title 24-compliant white-coated cap sheets. The even surfaces of the current inventive sheets provide continual energy saving reflectivity and emissivity because they do not retain the dirt and grime as the currently available Title 24-compliant white-coated cap sheets.

Another object of the current inventive sheets is that they are fire rated, non-combustible, will not ignite, will not retain a flame and will not burn.

Another object of the current inventive sheets is that they are dual carriers for energy conservation. Both the aluminum foil and the white resin coating function as energy conservation agents, with each compounding the effectiveness of the other.

Another object of the current inventive sheets is that they can last three-five (3-5) times longer than presently available Title 24-compliant white-coated sheet products, i.e., the current inventive sheets are believed to last up to ten years without the necessity to apply a new resin coating on the roof's surface.

These and other embodiments, features, aspects, and advantages of the present BUR surfacing sheets will become better understood with regard to the following description, appended claims and accompanying drawings.

BRIEF DESCRIPTION OF DRAWINGS

The foregoing aspects and the attendant advantages of the present surfacing sheets will become more readily appreciated by reference to the following detailed description, when taken in conjunction with the accompanying drawings, wherein:

FIG. 14 is a detailed schematic diagram of an alternate embodiment of an asphalt coater section of the preferred manufacturing line;

FIG. 15 is a detailed schematic diagram of an alternate embodiment of an asphalt coater second use in the preferred manufacturing line;

FIG. 16 is a detailed schematic diagram of a portion of an alternate preferred manufacturing line;

FIG. 17 is a detailed side view of an alternate coated foil feed section portion of the preferred manufacturing line;

Reference symbols or names are used in the Figures to indicate certain components, aspects or features shown therein. Reference symbols common to more than one Figure indicate like components, aspects or features shown therein.

DETAILED DESCRIPTION

Figure 1:
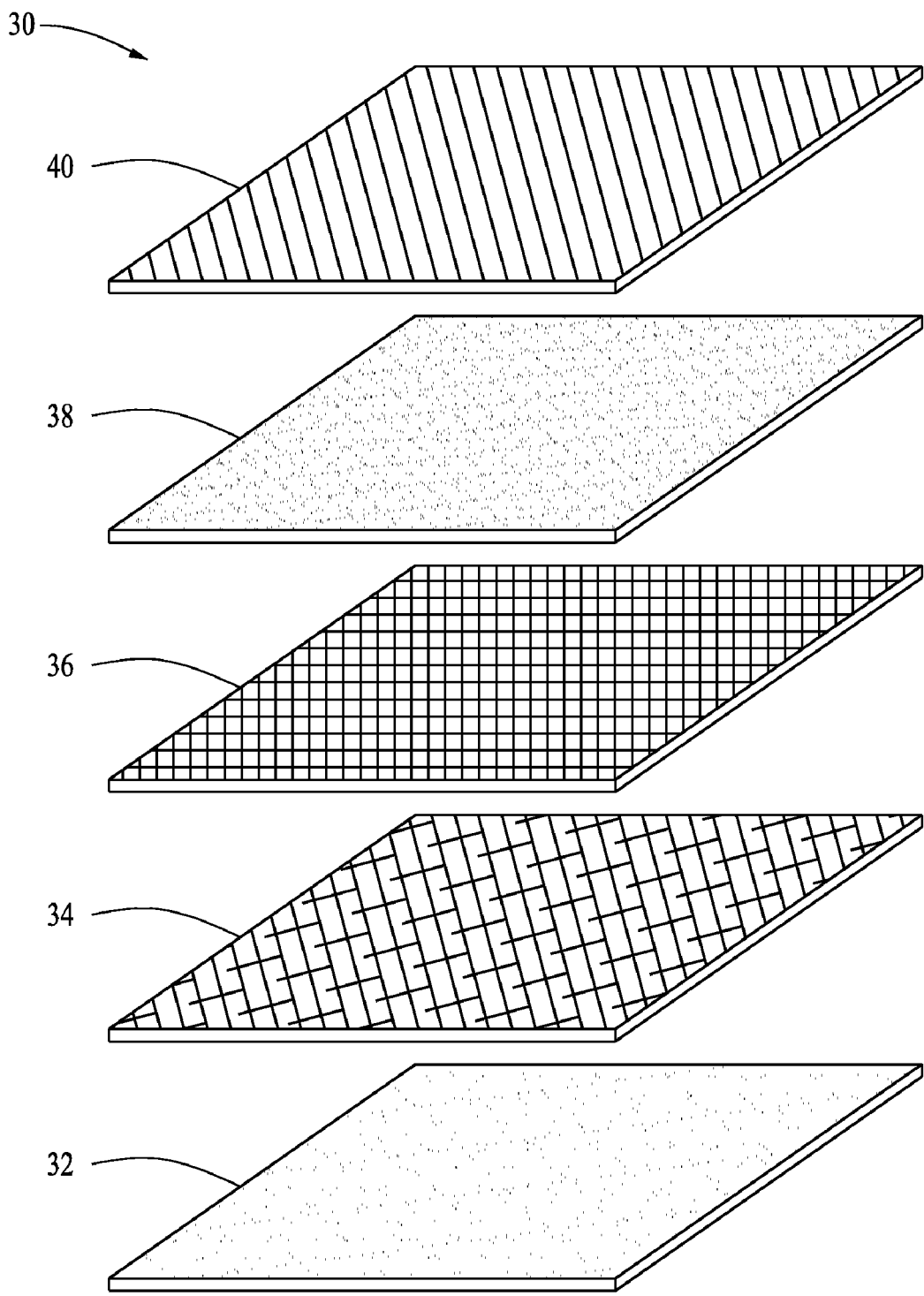
FIG. 1 is an exploded view of a conventional cap sheet.

With reference to FIGS. 1-23 preferred embodiments of the inventive surfacing sheets and methods of manufacture will be described. For convenience and for ease of understanding the inventive features of the present surfacing sheets embodiment, FIG. 1 is an exploded, perspective view of a conventional, Title 24-compliant BUR cap sheet 30 including layers of sand 32, fiberglass mat 34, asphalt coating 36, uneven granulated surface 38, and a coating 40. Numerous coatings 40 are commercially available.

Figure 2:
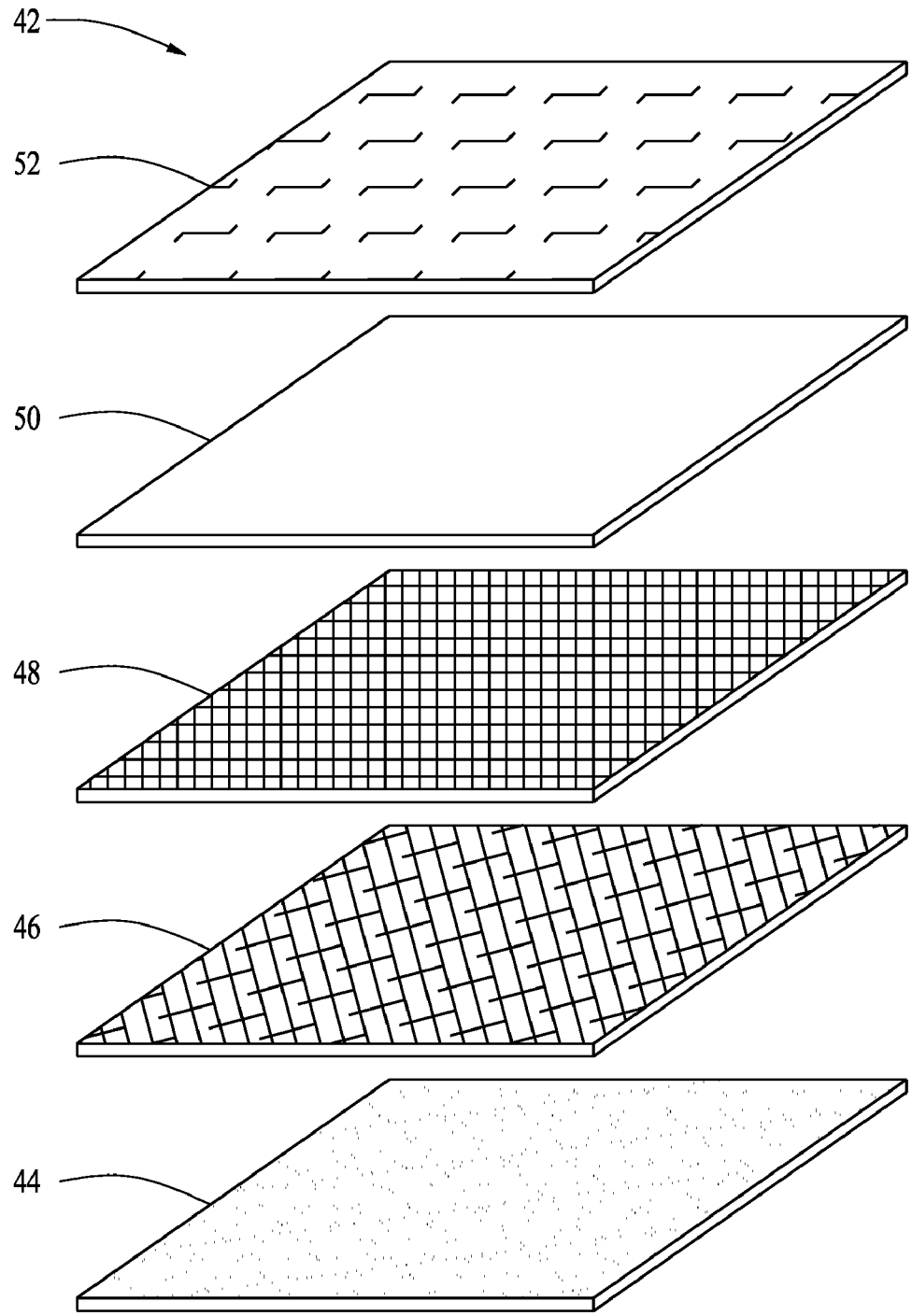
FIG. 2 is an exploded view a preferred embodiment of the present inventive surfacing sheets.

Referring to FIG. 2, an inventive, Title 24-compliant surfacing sheet 42 includes several layers that are different than those in the FIG. 1 cap sheet. The surface sheet 42 layers include a bottom layer of sand 44, fiberglass mat layer 46, asphalt coating layer 48, smooth aluminum foil layer 50 and a white resin coating layer 52. The fiberglass mat preferably weighs about 1.2 to 2.3 pounds per 100 feet square, i.e., 1 square. The smooth aluminum foil surface is preferably about 0.0001 mil to about 1.5 mil thick. The white resin coating is preferably about 1 mil to about 7 mil thick.

Figure 3:
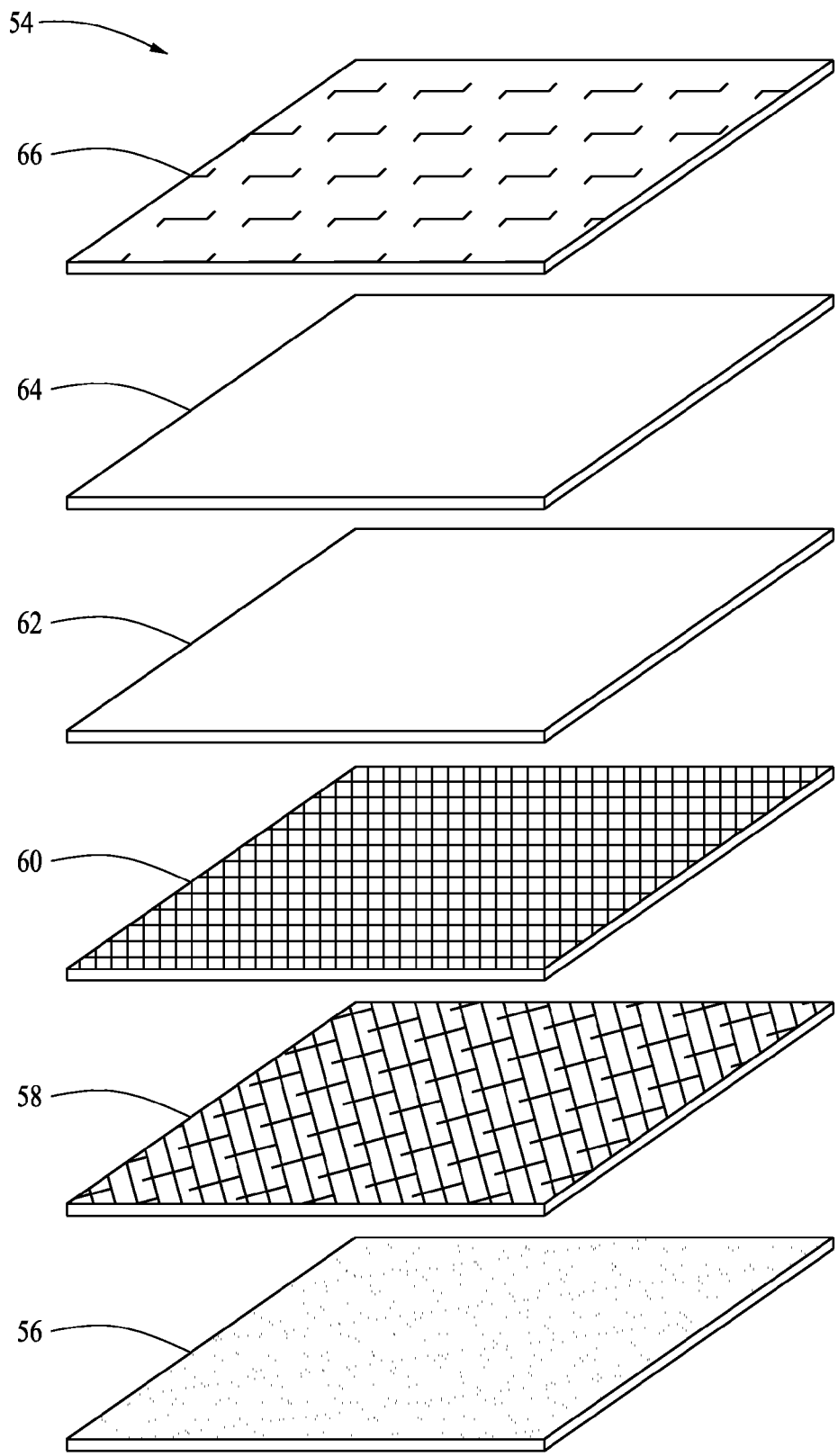
FIG. 3 is an exploded view of the most preferred embodiment of the present inventive surfacing sheets.

Referring to FIG. 3, an alternate preferred embodiment surfacing sheet 54 is shown. The FIG. 3 embodiment is the most preferred embodiment and includes an additional, reinforcing layer in comparison to the FIG. 2 surfacing sheet. Sheet 54 includes a bottom layer of sand 56, a fiberglass mat layer 58, an asphalt coating layer 60, a PET (polyethylene terephtalate) reinforcing layer 62, a smooth aluminum foil layer 64 and a white resin coating layer 66.

Figure 4:
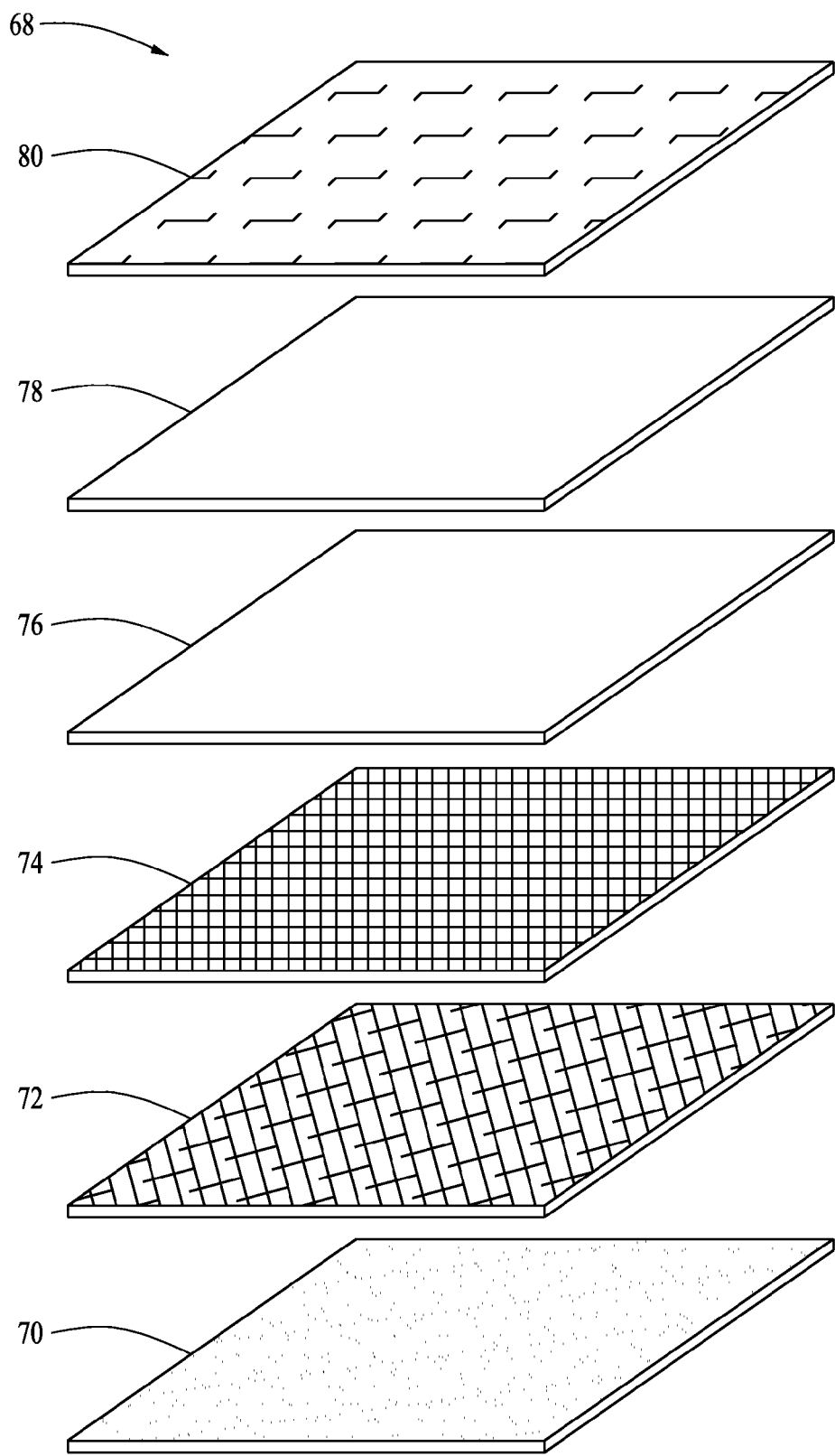
FIG. 4 is an explode view of an alternate preferred embodiment of the present inventive surfacing sheets.

Referring to FIG. 4, another alternate preferred embodiment surfacing sheet 68 is shown. The FIG. 4 embodiment includes an additional, reinforcing layer, similar to the PET reinforcing layer 62 in the FIG. 3 embodiment, except that the reinforcing layer in the FIG. 4 embodiment is a sheet of paper. Sheet 68 includes a bottom layer of sand 70, a fiberglass mat layer 72, an asphalt coating layer 74, a paper reinforcing layer 76, a smooth aluminum foil layer 78 and a white resin coating layer 80.

The surfacing sheets described in detail herein are fire retardant, white on one side and manufactured form a heavy fiberglass mat that has been bonded with a resinous binder and coated with bitumen. The white side as a brilliant, white acrylic smooth surface finish. The glass mat has reinforcing that includes glass fibers that are uniformly distributed and aligned to impart strength in all directions while displaying excellent dimensional stability throughout. These surfacing sheets may be used as a surfacing sheet over any build-up or modified bitumen roof where energy savings is desired. In comparison to conventional built up roofing surfacing sheets the presently described sheets have extremely high solar reflectance, extend roof life, reduce energy loads, are lower in weight, are extremely durable, and are easier to apply to a roof. There is more coverage per roll, there are time and money savings and application is less labor intensive.

The most preferred white, resin-coated aluminum foils used in the present process and surfacing sheet is available from Cleveland Laminating Corp., as its product CLC 9000. This product has a white resin coating on one side and a coating of PET on the other side of the aluminum foil, with the PET layer functioning to reinforce the sheet. The CLC 9000 product is a former Cleveland Laminating product, i.e., CLC product 8915, an aluminum foil which has been coated on one side with PET and coated with a white acrylic layer 42 on the other side to become the CLC 9000 product. The CLC 9000 product has a 0.000285 mil thick aluminum foil with a 0.00048 mil thick PET coating on one side and a 0.003 mil thick, nominal white acrylic coating on the other side. The coatings are uniform and have a smooth surface. The CLC 9000 product is available in rolls having a width of 36 inches=/−1/16 inch and roll diameters of 20 inches to 40 inches OD, and wound on a 3 inch I.D. tube. A preferred, alternate coated foil is available as Cleveland Laminating's product CLC 964, which is a white coated aluminum foil that has been coated or laminated with acrylic polymer resins on one side and that does not have a coating on the other side.

The CLC 964 product includes aluminum foil, in a concentration in the range of about 27-30% by weight; acrylic polymers in a concentration in the range of about 25-30% by weight; pigments in a concentration in the range of about 40-45% by weight; and inert ingredients in a concentration of less than 1.0% by weight. The white resin-coated foil is preferably manufactured and coated in widths of 33 1/3 inches or 36-inches, which is a typical width for asphaltic roofing products, such as BUR surfacing sheets. This coated foil has an initial SR value of 85 and a TE value of 84 per testing. This coated foil has a CRRC® (Cool Roof Rating Council) initial SR rating of 0.83 and an initial TE rating of 0.83.

In the CLC 9000 surfacing sheet, the bottom side of the white resin-coated aluminum sheet has a PET film. The PET film is positioned between the aluminum foil and the asphalt-impregnated fiberglass mat, and is believed to add flexibility to the aluminum foil interface, so that finished surfacing sheet is less likely to crack due to thermal shock from normal weather conditions. In another alternate embodiment a layer of paper is placed on the bottom side of the aluminum foil, that is, between the aluminum foil and the asphalt-impregnated fiberglass mat. The paper layer is believed to add stability to the finished product. The paper sheet stability and the PET layer flexibility in general provide reinforcing to the surfacing sheet, and thus are referred to as reinforcing layers, even though they are believed to provide different types of reinforcement. The PET film coated product and the paper-layered products have reduced delaminating potential.

Finished BUR surfacing sheets made in accordance with the process described below have an average weight in the range of about 30-90 pounds for a 2-square roll (15-45 pounds for 1 square), a machine direction ("MD") breaking strength of about 70 pounds and a cross machine direction ("CMD") breaking strength of about 65 pounds. Finished surfacing sheet using the CLC 9000 product has an average MD value of 69 and an average CMD value of 75 per testing. In this field the MD breaking strength refers to the force needed to break the sheet in its length direction, that is, along the direction that the mat advances on the manufacturing line. The CMD breaking strength refers to the force needed to break the sheet in the width direction, that is, across or perpendicular to the direction of movement of the mat along the manufacturing line. For comparison, a conventional base sheet used in this field has a nominal MD and CMD breaking strength of 50 pounds and 50 pounds, respectively. Also, a conventional cap sheet has a nominal MD and CMD breaking strength of 55 pounds and 55 pounds, respectively.

The white, reflective resin coated aluminum foil is an important aspect of the present surfacing sheet. A variety of aluminum foils can be used, such as reinforced, thin or thick, with the foil then coated with a white resin. In one embodiment the foil is coated, cured and packaged into rolls of continuous coated foil that is then used in the manufacturing process described herein. The most preferred product is made with reinforced coated foil sheets, with the most preferred reinforcing being the PET coating. As described above, alternate embodiments can have a PET film layer, or a paper layer positioned between the asphalted fiberglass mat and the aluminum foil. The top surface of the coated foil is white, and has relatively high SR values, typically in the low to mid 80's and TE values, typically in the low to mid 80's. Aluminum foil itself is inherently fire resistant and the degree of fire resistance can be increased with increasing thickness of foil.

Thus, in the presently most preferred embodiment, a pre-coated, reinforced, white Title 24-compliant surfacing sheet is used by a roofing products manufacturer in the production of the BUR surfacing sheet. In the manufacturing process, instead of granules being embedded in the hot asphalt coated fiberglass mat as in a conventional cap sheet manufacturing process, the white resin coated, reinforced surfacing sheet is pressed into or otherwise adhered to the asphalt coated mat.

Another important aspect of the presently described surfacing sheets is that they can be manufactured using a conventional cap sheet manufacturing line that includes inventive modifications, as will be described below. Thus, a conventional cap sheet manufacturing line can be modified to produce the presently described Title 24-compliant surfacing sheets. The cost to modify an existing manufacturing line is significantly less than the cost associated with a new manufacturing line, and this relative cost saving is factored in the overall cost of producing the surfacing sheets described herein.

Figure 5:
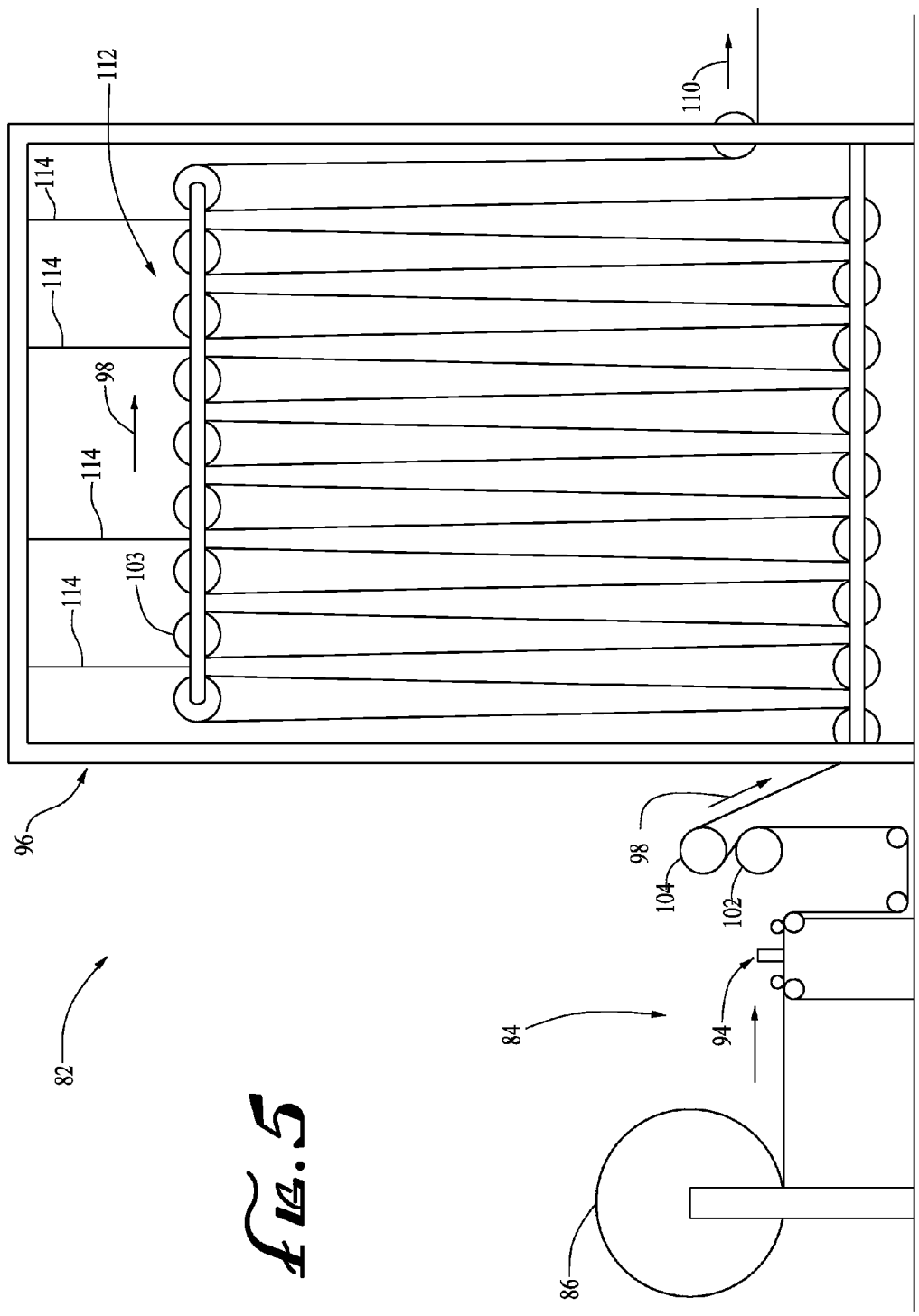
FIG. 5 is a schematic diagram of a first section of a preferred manufacturing line for the FIGS. 2-4 surfacing sheets.
Figure 6:
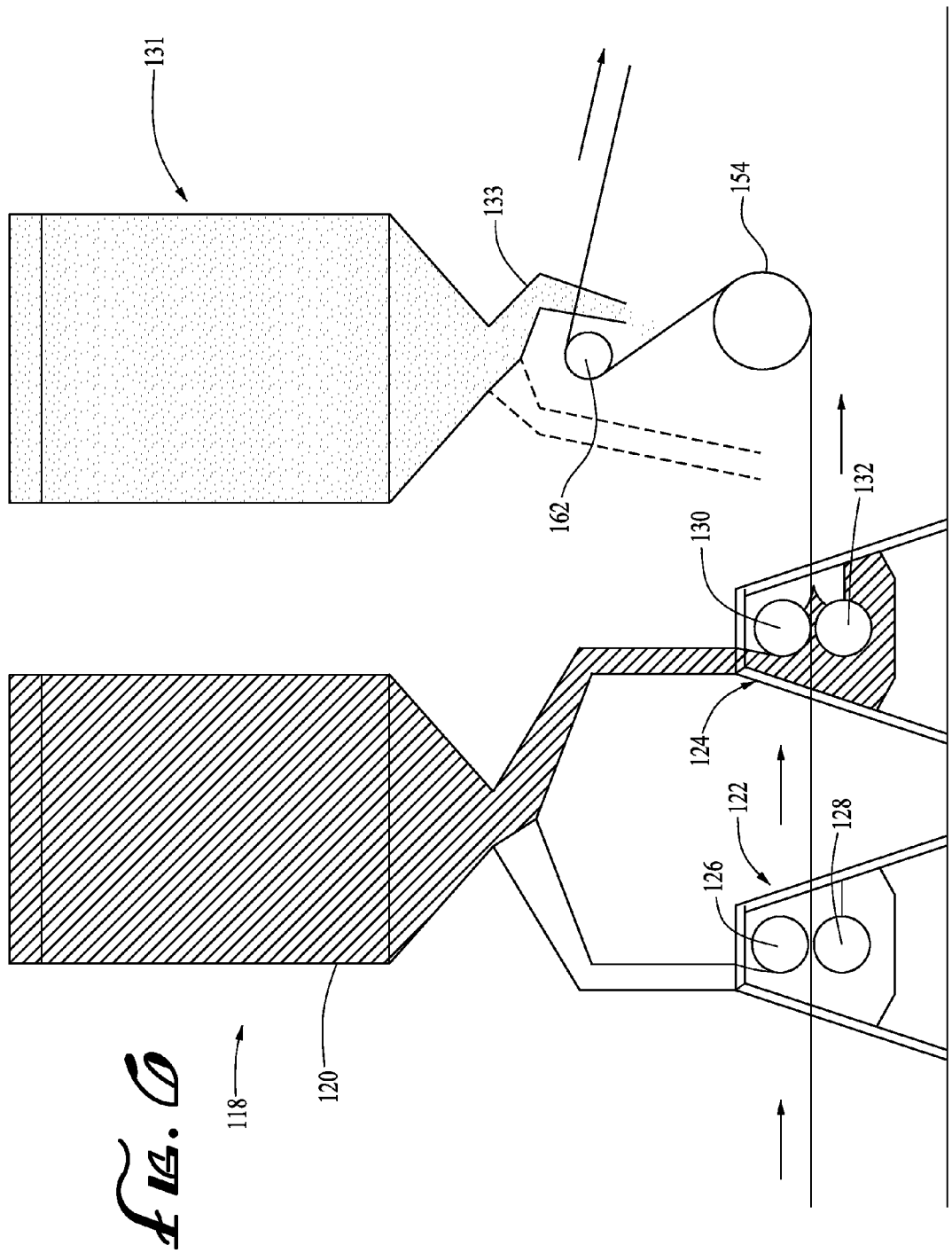
FIG. 6 is a schematic diagram of a second section of the preferred manufacturing line.
Figure 7:
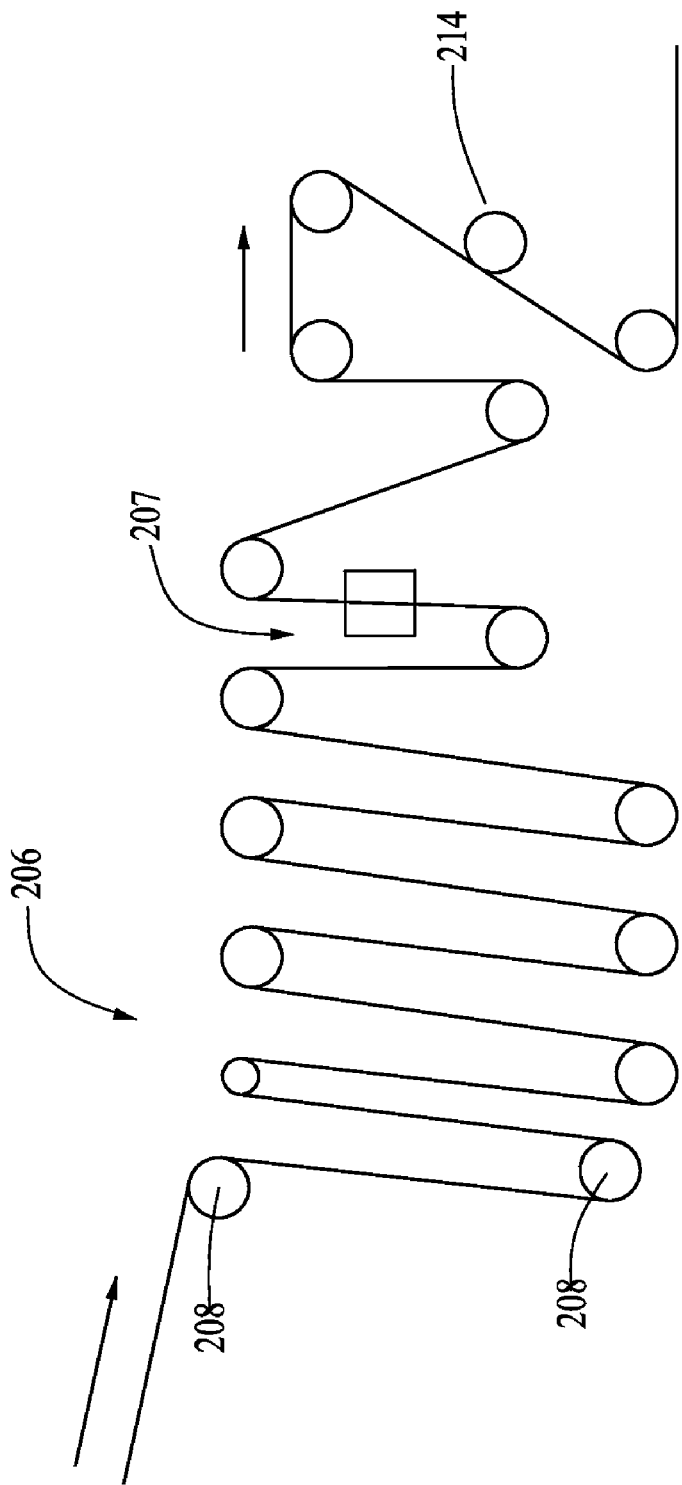
FIG. 7 is a schematic diagram of a third section of the preferred manufacturing line.
Figure 8:
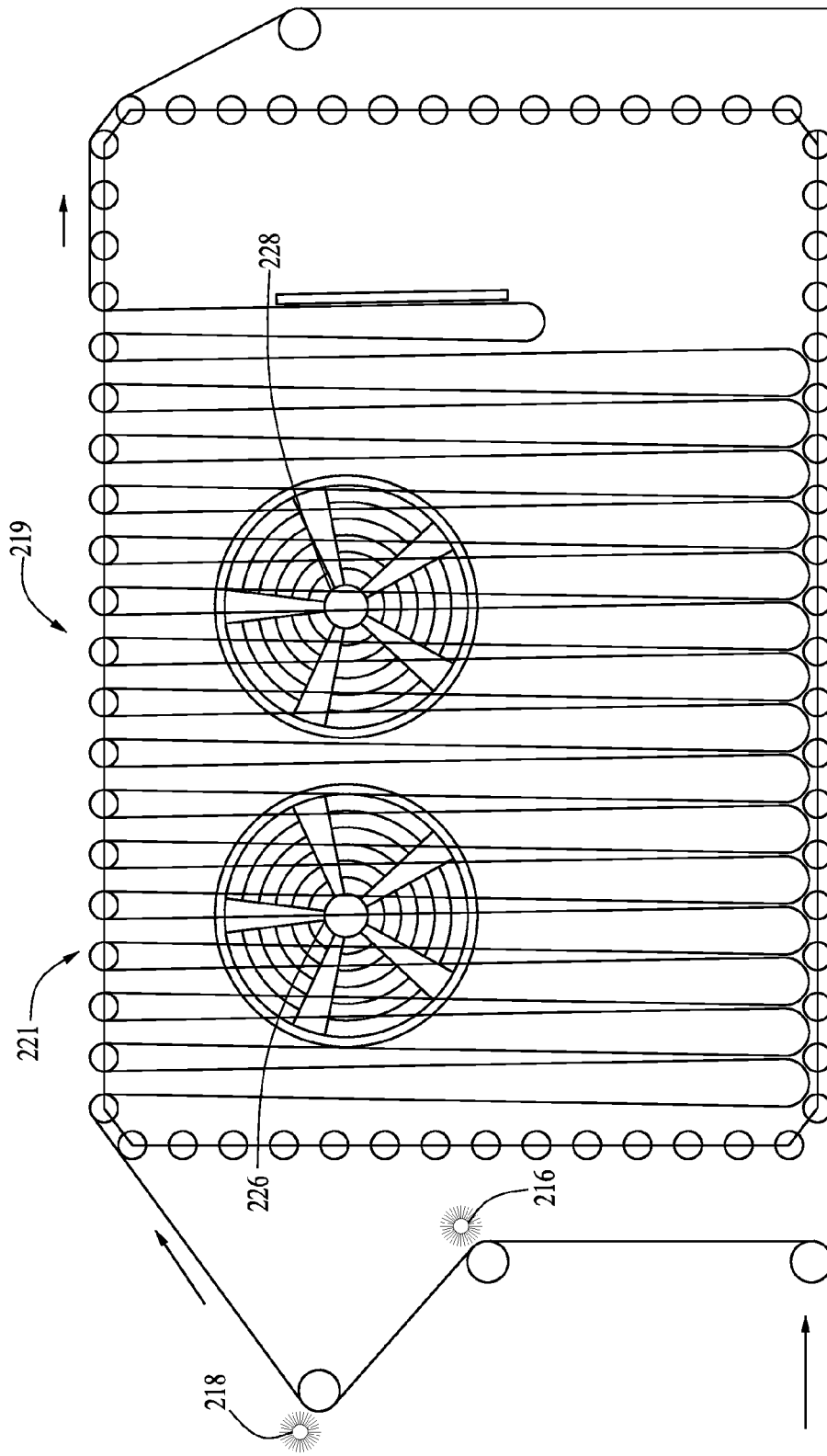
FIG. 8 is a schematic diagram of a fourth section of the preferred manufacturing line.
Figure 9:
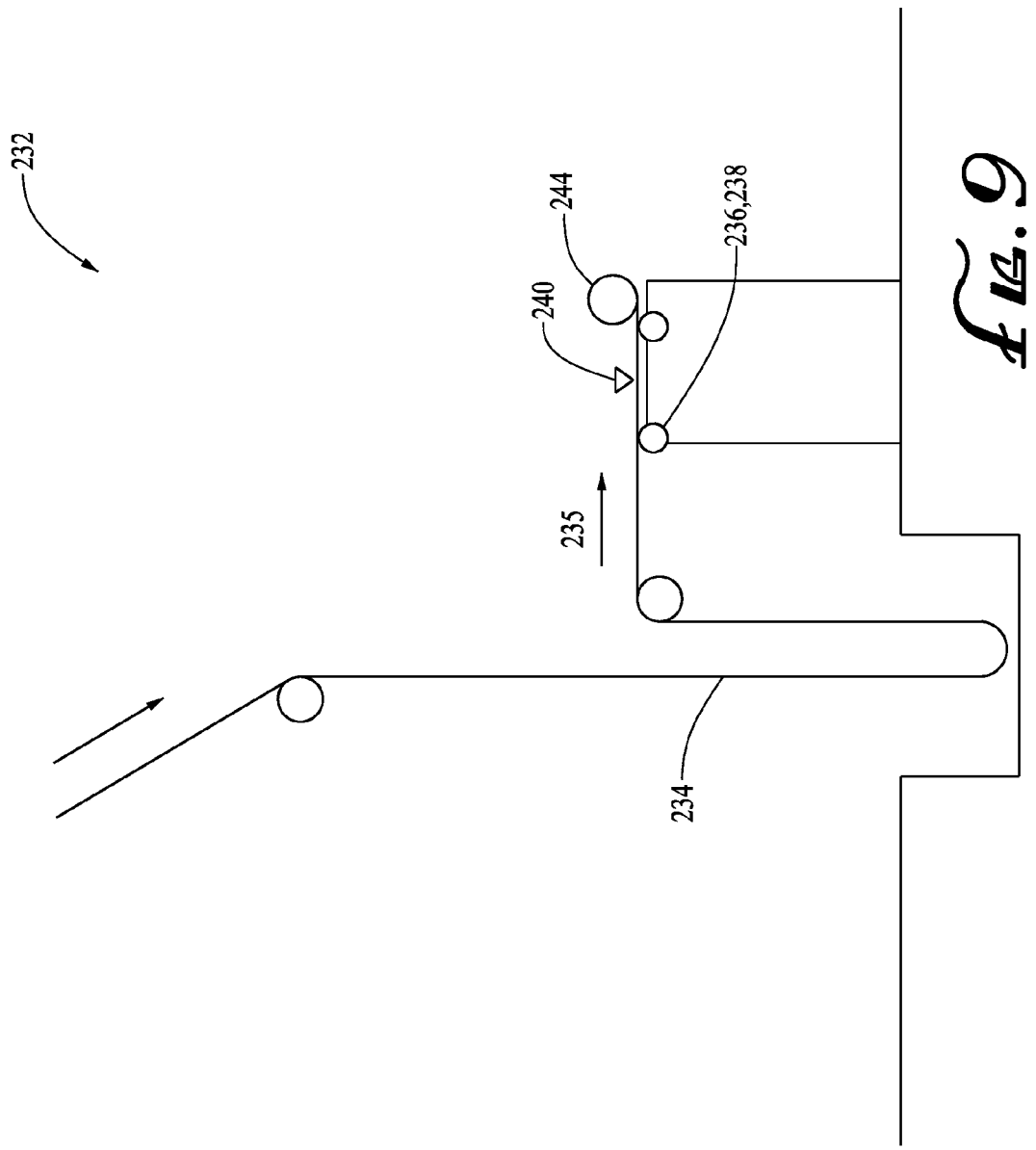
FIG. 9 is a schematic diagram of a fifth section of the preferred manufacturing line.
Figure 10:
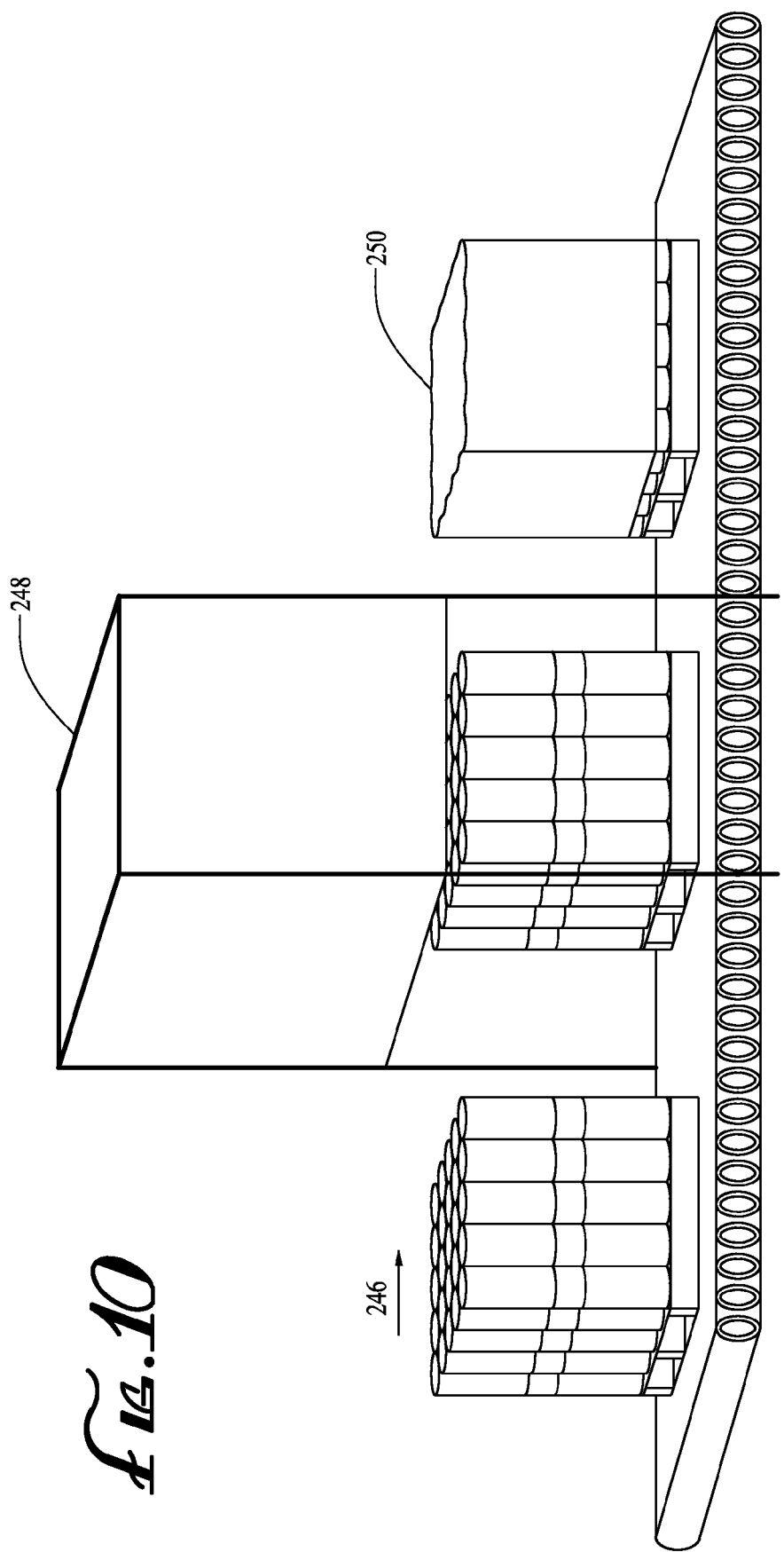
FIG. 10 is a schematic diagram of a sixth section of the preferred manufacturing line.

The BUR White, Resin-Coated Aluminum Surfacing Sheet Manufacturing Process in General In general the inventive surfacing sheet is manufactured by unrolling an uncoated fiberglass mat and feeding it continuously, using splices as necessary, into a dry felt looper as shown in FIG. 5. The mat is then coated with hot asphalt and the white, resin-coated, preferably reinforced aluminum foil is then applied or adhered to the top or front side of the mat. Next, a parting agent, preferably sand is applied to the bottom or back side of the asphalt-coated mat with sand from vat 131, as shown in FIG. 6. Also shown in FIG. 6, in dashed lines, is an upstream sand application tube that is not used in the presently preferred embodiments. Rather, only the downstream sand application vat 133 is used to apply sand to the asphalt coated mat. The surfacing sheet is then is cooled and cured, trimmed and marked with a ply stripe as shown in FIGS. 7 and 8. The cured surfacing sheet is then rolled up, packaged into single, two-square rolls (each roll having 200 square feet of useable surfacing sheet and 8 square feet of salvage edge along one side of the roll) and made ready for shipping as shown in FIGS. 9 and 10. Details of the manufacturing process are provided below with additional reference to FIGS. 11-22.

Detailed Description of a Preferred Manufacturing Process

Figure 11:
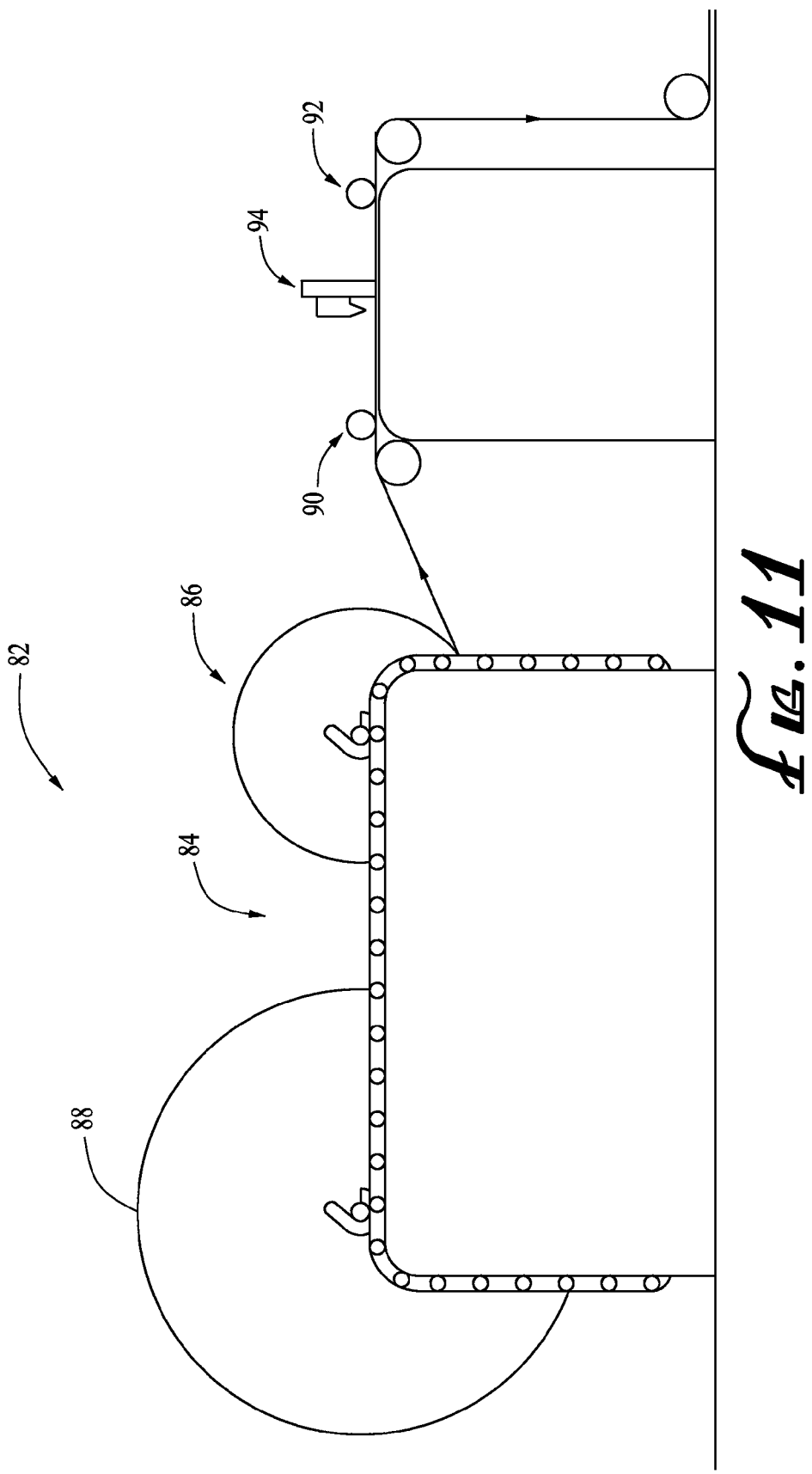
FIG. 11 is a detailed schematic diagram of a first portion of the preferred manufacturing line.
Figure 12:
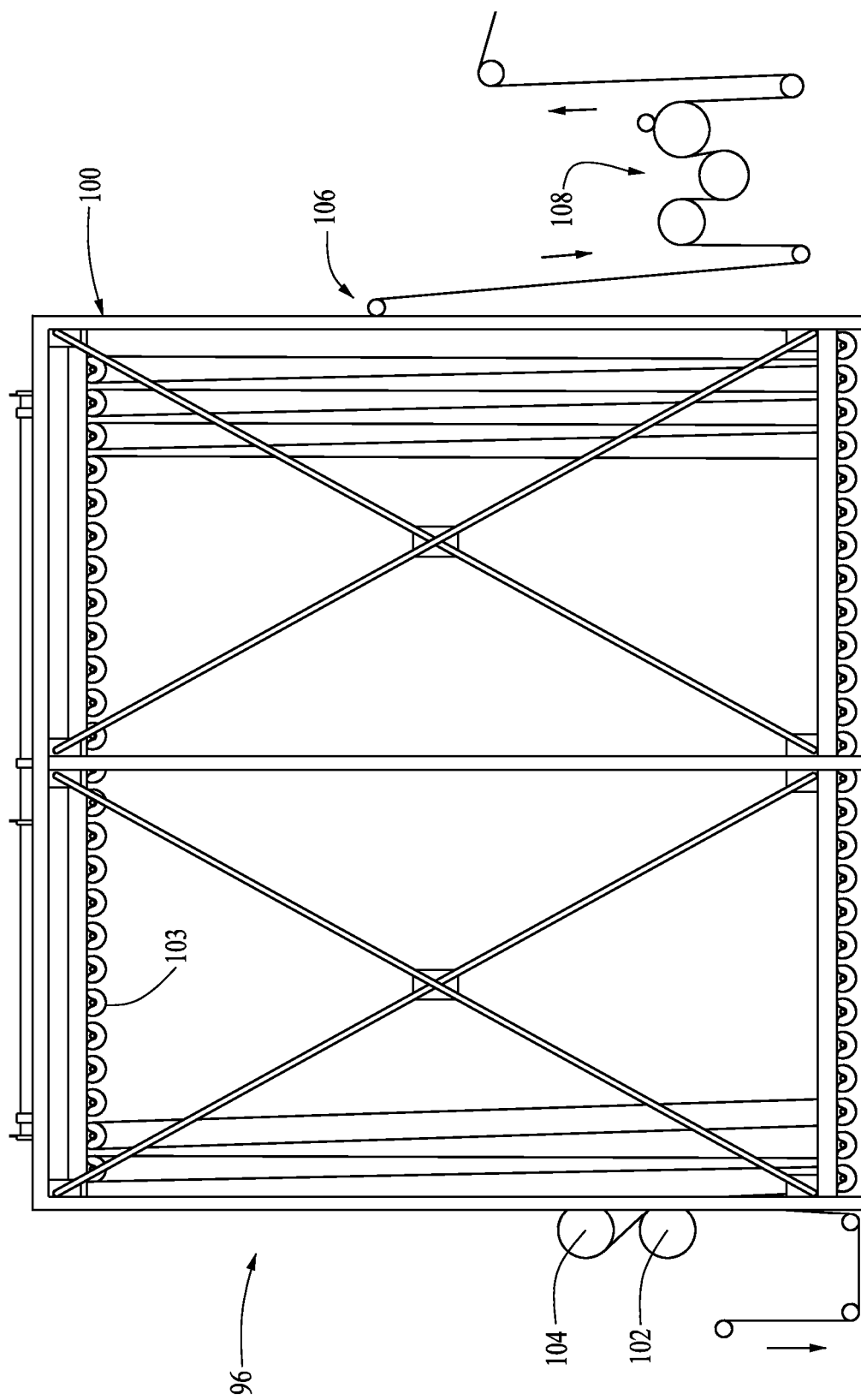
FIG. 12 is a detailed schematic diagram of a second portion of the preferred manufacturing line.

Referring to FIGS. 5, 11 and 12 the first section 82 of a preferred manufacturing line and process will be described. The manufacturing line described herein is a line that has been modified from a conventional cap sheet manufacturing line. Fiberglass mat roll unwind stand or turret 84 includes fiberglass rolls 86 and 88, with the mat moving during the manufacturing process in the direction of the various arrows shown in the figures, some of which are numbered and some of which are not. Air brake rolls 102 and 104 hold the fiberglass mat in place and allow a splice to be made with an automated hot melt glue gun 94. When one roll 86 of fiberglass mat, the downstream roll, is exhausted, the turret stand 84 is operated to rotate the then spent roll 86 out of the line and the new, upstream roll 88 into the line to provide a fresh supply of fiberglass mat. After exiting the air brakes, the fiberglass mat enters the dry felt looper 96, also known as festoon 96, shown in FIGS. 5 and 12 and advances in the direction of arrow 98 as shown in FIG. 5. The looper 96 includes an accumulator 100, brake rolls 102, and 104, a plurality of internal rolls, one of which is numbered 103, dancer roll 106 and a plurality of pull rolls 108. The accumulator 100 is a floating festoon that allows for continuous running of the line while making a splice. The brake rolls 102, 104 are used to stop the mat from feeding the festoon while making a mat splice, during which time the downstream part of the mat in the accumulator 100 travels down the line in the direction of arrow 110 and supplies the downstream line with mat. The roll assembly 103 lowers on conventional ballast-weighted chains 114 during this splicing process, and the pull rolls 108 pull the mat through the dry felt looper or festoon 96.

Figure 13:
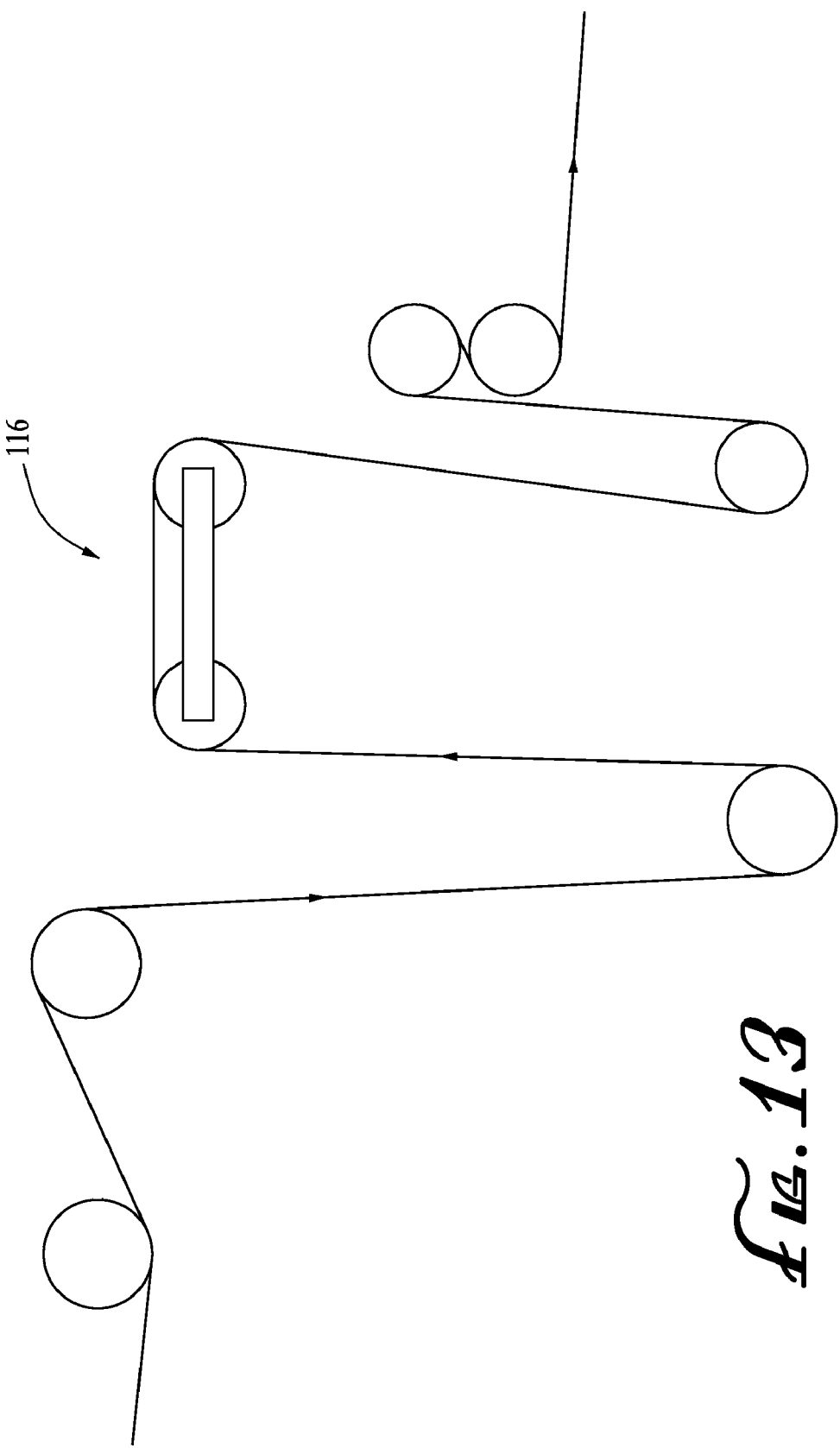
FIG. 13 is a detailed schematic diagram of another portion of the preferred manufacturing.

Referring to FIG. 13 a fife guide system 116 keeps the mat in alignment with asphalt coaters that are shown in FIGS. 6, 14 and 15, as the mat moves along the line in the directions of the numbered and unnumbered arrows.

As an alternate embodiment manufacturing line and process an additional fife guide assembly may be installed upstream or downstream of the fife guide 116. A double fife guide system provides a coarse or gross guide and a fine guide capability.

FIG. 6 shows an asphalt coating section 118 having an asphalt hopper or vat 120 that feeds a first or upstream asphalt coater 122, and a second, or downstream asphalt coater 124 In the presently preferred process, only one coater is used and it is the downstream coater 124. The asphalt coaters include coater rolls, with upper coater roll 126 and lower coater roll 128 shown for the upstream coater 122, and with upper coater roll 130 and lower coater roll 132 shown for the downstream coater 124.

After the mat is coated with hot, preferably filled asphalt, then the white, resin-coated, reinforced aluminum foil or sheet is applied or adhered to the top or front side of the mat, as shown schematically in FIG. 6 and in greater detail in FIGS. 14-19. As shown in FIG. 14, upper and lower doctor blades 134 positioned adjacent and downstream of coater rolls 126, 128 are adjusted to wipe excess asphalt off of the mat and return it to the pan 136 when the upstream asphalt coater 124. In the preferred manufacturing process only the downstream asphalt coater 124 is used, with upper and lower doctor blades 138 used to wipe off excess asphalt, as shown in FIG. 15, with the asphalt flowing down from the vat 120 in the direction of arrow 140 and excess asphalt falling into tank or vat 142. The doctor blades function to control the thickness of the asphalt, and thus, control in significant part the weight of the finished surfacing sheets.

The manufacturing process described herein produces what is known in the field of invention as a closed sheet. The coated mat is fed from coater basket 144 onto the moving mat prior to coating the mat with asphalt at the coater rolls 130, 132. In the preferred process the downstream coater is used with an asphalt filled with conventional filler, preferably limestone. The limestone can be up to 70% by weight of the preferred filled asphalt. Several types of coatings on the fiberglass mat are preferred. The most preferred is a conventional asphalt coating, which can be filled or unfilled, and is known in this field as BURA (Built Up Roofing Asphalt) and is an air blown asphalt. The filler provides for better economy, and also fills up some of the holes. Secondly, another preferred asphalt is modified Bitumen asphalt, commonly referred to as S.B.S. Third, a combination of BURA and S.B.S. is also a preferred asphalt coating for the fiberglass mat.

Referring to FIG. 16, white, resin-coated, preferably reinforced aluminum foil is applied to the asphalt-coated mat as the mat is advanced along the manufacturing line in coated foil application section 146. The resin coated, reinforced aluminum foil is provided in a roll, shown schematically as roll 148 in FIG. 16. The roll 148 is unrolled and applied to the top or front of the asphalt-coated mat using guide roll 150 and applicator roll 152, shown to be adjacent to and downstream from the asphalt coater rolls 130, 132. The resin-coated, preferably reinforced aluminum sheet is initially pressed into the asphalt coating by the applicator roll 152 and, later in the process, by the surfacing roll 154. Between the rolls 152, 154 the asphalt coated mat passes by metering rolls 156 and 158. However, for the preferred surfacing sheet manufacturing process only metering roll 158 is used. Then sand is applied to the bottom or back side of the asphalt-coated mat by and at sand metering roll 160, shown schematically in FIG. 16. After sand is applied to the back or bottom of the asphalt-coated mat at and by sand metering roll 160, the mat is turned over and the sand is pressed into the asphalt by the turn-over roll 162. Optionally a press roll 164 may also be used to press a pattern, such as cross-hatching, to enhance flexibility of the finished product. When the mat continues around the turn-over roll 162, the resin-coated, reinforced aluminum sheet is pressed into the mat by the forces applied and turn-over roll 162, and optionally roll 164, as shown in FIG. 16. The resin-coated, preferably reinforced aluminum sheet is thus adhered to the asphalt-coated mat to form the surfacing sheet.

While the application of the resin-coated aluminum sheet is described and shown above, schematically, in the preferred manufacturing line, production-sized rolls of the resin-coated aluminum sheet can't fit in-line within the manufacturing line. Such rolls are too big to fit in the space available, although relatively small, test sized rolls can be set up in-line. Thus, in another important aspect of the present manufacturing process, a separate coated aluminum sheet roll feed section is provided in a separate line than runs parallel to the main manufacturing line. This separate feed roll section includes structures to permit changing the direction of flow of the coated aluminum sheet so that the coated sheet is first unrolled in the same direction as, but parallel to the direction of movement of the asphalt coated mat, then is turned 90-degrees toward the main line so that the coated foil moves from the feed section to the main line, then is turned 90-degrees back toward the main line so that the coated foil moves along, but above the moving asphalt coated mat.

Referring to FIG. 17, a side view of the coated foil unwind section 166, a coated foil feed stand or turret 168 includes a downstream roll 170 of coated aluminum foil, and upstream roll 172 of coated aluminum foil and a rotatable turret 174, like the mechanism shown in FIG. 11 for the fiberglass mat. The unwind section 166 also includes guide rolls 176, 178 and brake rolls 180, 182. The coated foil, shown at 184 then is passed to a festoon 186 that operates as does the festoon shown and described with reference to FIGS. 5 and 12, so as to permit replacement of a spent roll with a fresh roll by splicing the tail end of the spent roll to the leading end of the fresh roll, without stopping the manufacturing line. At the downstream end of the festoon 186, pull rolls 188, 190, preferably 6-inch diameter rolls, pull the coated foil through the festoon, and pass the coated foil to the speed control dancer roll 192, and its associated stationary rolls 194, 196, each of which is preferably a 4-inch diameter roll. The coated roll feed section is positioned along a line parallel to the direction of movement of the fiberglass mat of the main production line, but is offset from the main line. Adjacent and downstream of roll 196, the moving coated foil is turned 90-degrees toward the main production line at a first turn, roll 198. The turn roll 198 is preferably a 4-inch diameter roll.

Figure 18:
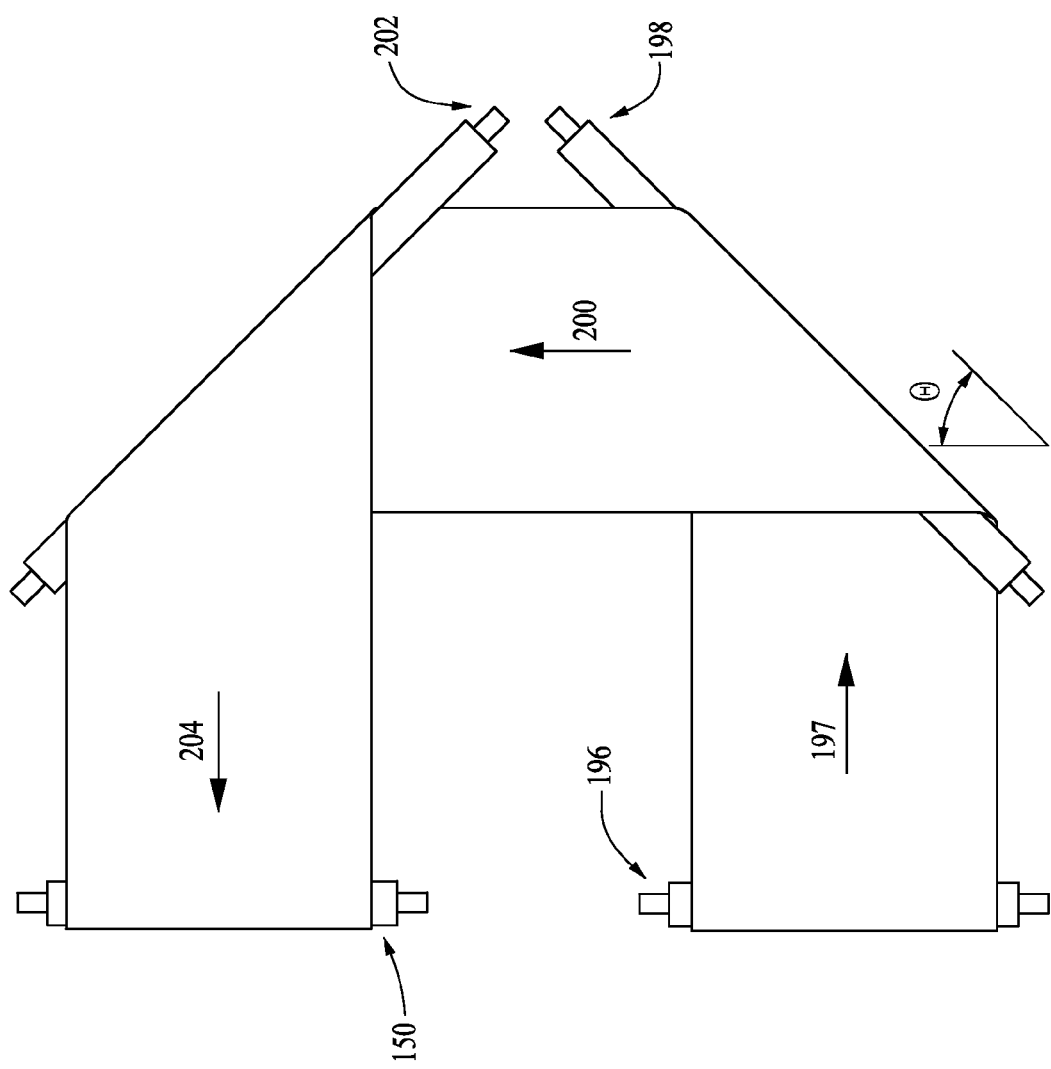
FIG. 18 is a detailed top view of the alternate coated foil feed section of FIG. 17
Figure 19:
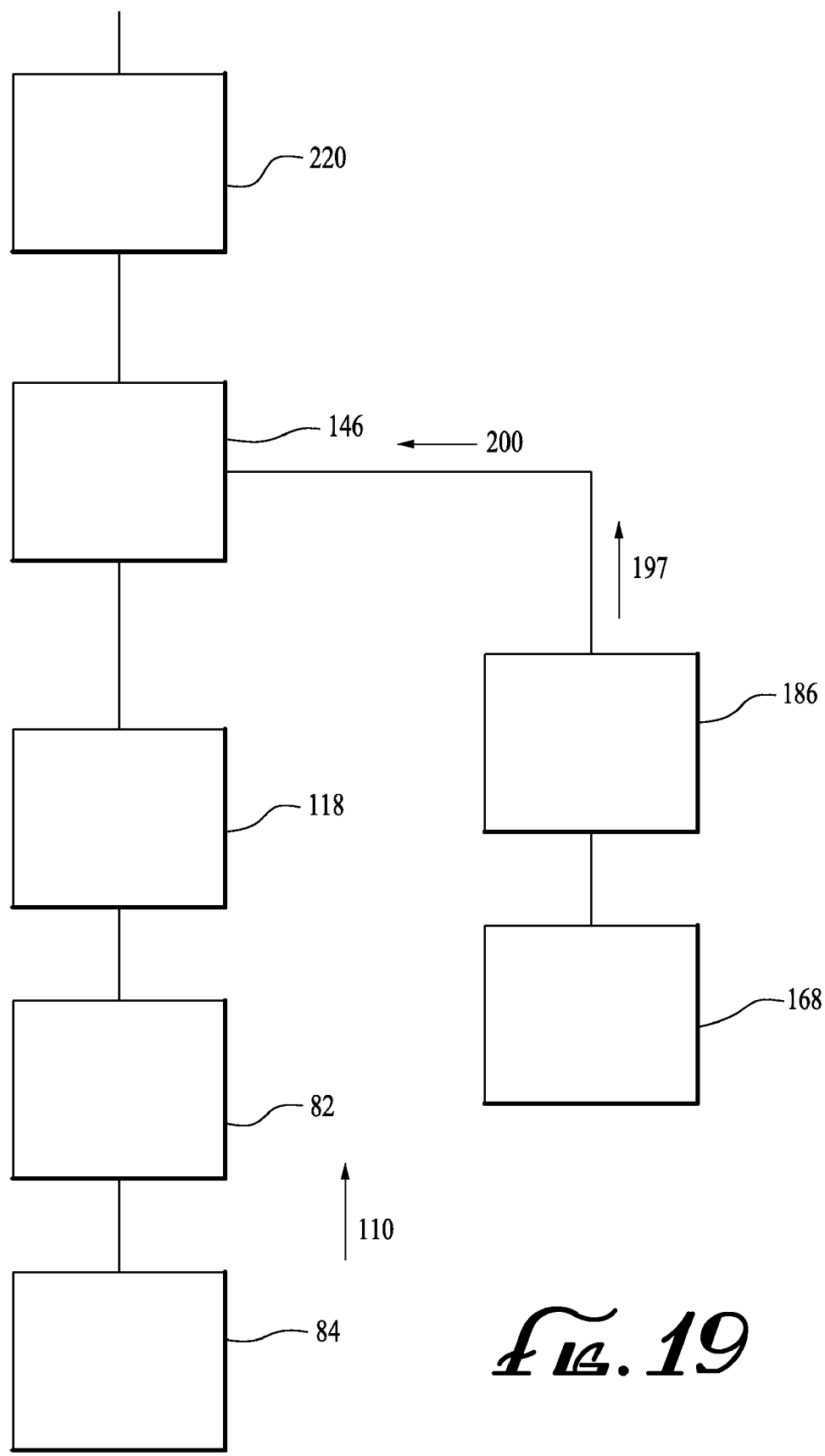
FIG. 19 is a block diagram showing the general spatial relationship of the preferred manufacturing line and the FIG. 18 alternate coated foil feed section, each to the other.

Referring to FIG. 18, a top, schematic view of the coated foil feed section, includes roll 196 and first turn roll 198. The axis of rotation of the first turn roll 198 is at an angle of 45-degrees from the axis of rotation of roll 196. The coated foil then travels in the direction of arrow 200 from the coated foil section to the main production line, where it is then turned another 90-degrees by second turn roll 202, also preferably a 4-inch diameter roll. The moving coated roll then moves in the direction opposite to its initial direction, and thus moves along the line of movement of the fiberglass mat in the main production line, but in the opposite direction, shown at arrow 204 in FIG. 18. As is also apparent from FIG. 18, the coated foil is passed under roll 198, and under roll 202 when making its two, 90-degree turns. With reference to FIG. 18 and the most preferred embodiment, the PET reinforced side of the coated foil is on the top side in the region from roll 196 to roll 198. The coated foil is turned over at roll 198, so that the acrylic coated side of the foil is shown as the top side in the region from roll 198 to roll 202. The coated foil is again turned over at roll 202, so that the PET reinforcement side is shown on the top in the region from roll 202 to roll 150. The coated foil is then adhered to the asphalt coated fiberglass mat, as shown schematically in FIG. 16.

Figure 20:
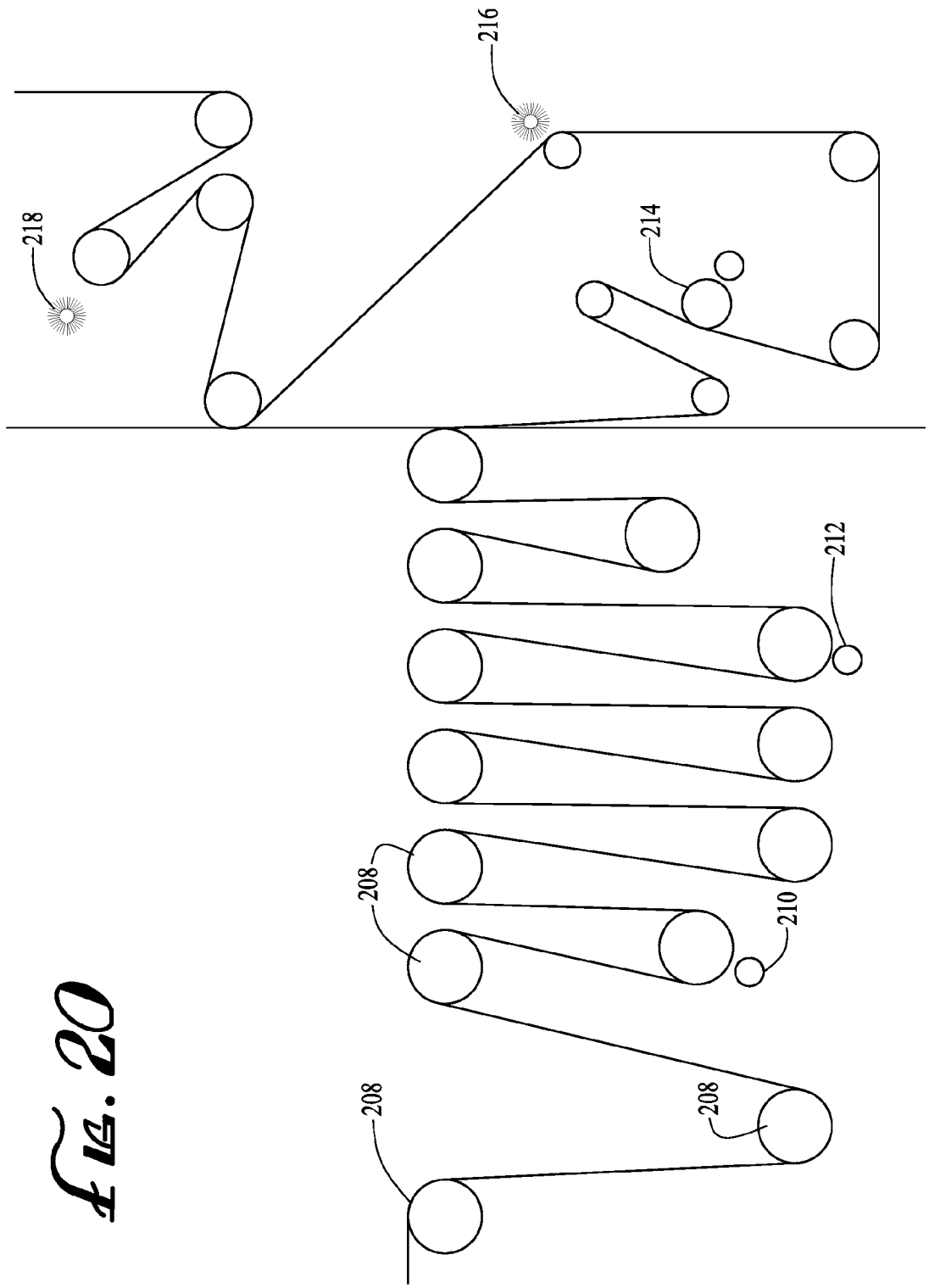
FIG. 20 is a detailed schematic diagram of a portion of the preferred manufacturing line.

Referring now to FIGS. 7 and 20, the cooling section and process will be described. After the asphalt-coated mat has had the white resin-coated, preferably reinforced aluminum sheet adhered to one side and sand to its other side, the thus coated mat is fed into a cooler section 206. The cooler section 206 includes a series of water-cooled rolls 208, several of which are numbered in FIGS. 7 and 20, and press rolls 210 and 212, shown in FIG. 20. Also included is a nuclear scanner at 207, preferably a scanner available from NDC. Press rolls 210 and 212 are used as needed to apply more adhesion pressure to the surfacing sheet. Following the cooling and optional additional pressing, the surfacing sheet continues its forward motion and a ply stripe, to identify the salvage edge, is applied by inking roll 214. The ply stripe identifies a 2-inch boarder, or salvaging edge along the surfacing strip, and when including this 2-inch boarder, each square has a total of 108 square feet of surfacing sheet. In the field of invention, because only 100 square feet is useable, a single square is commonly understood to include only 100 square feet, rather than 108 square feet.

Figure 21:
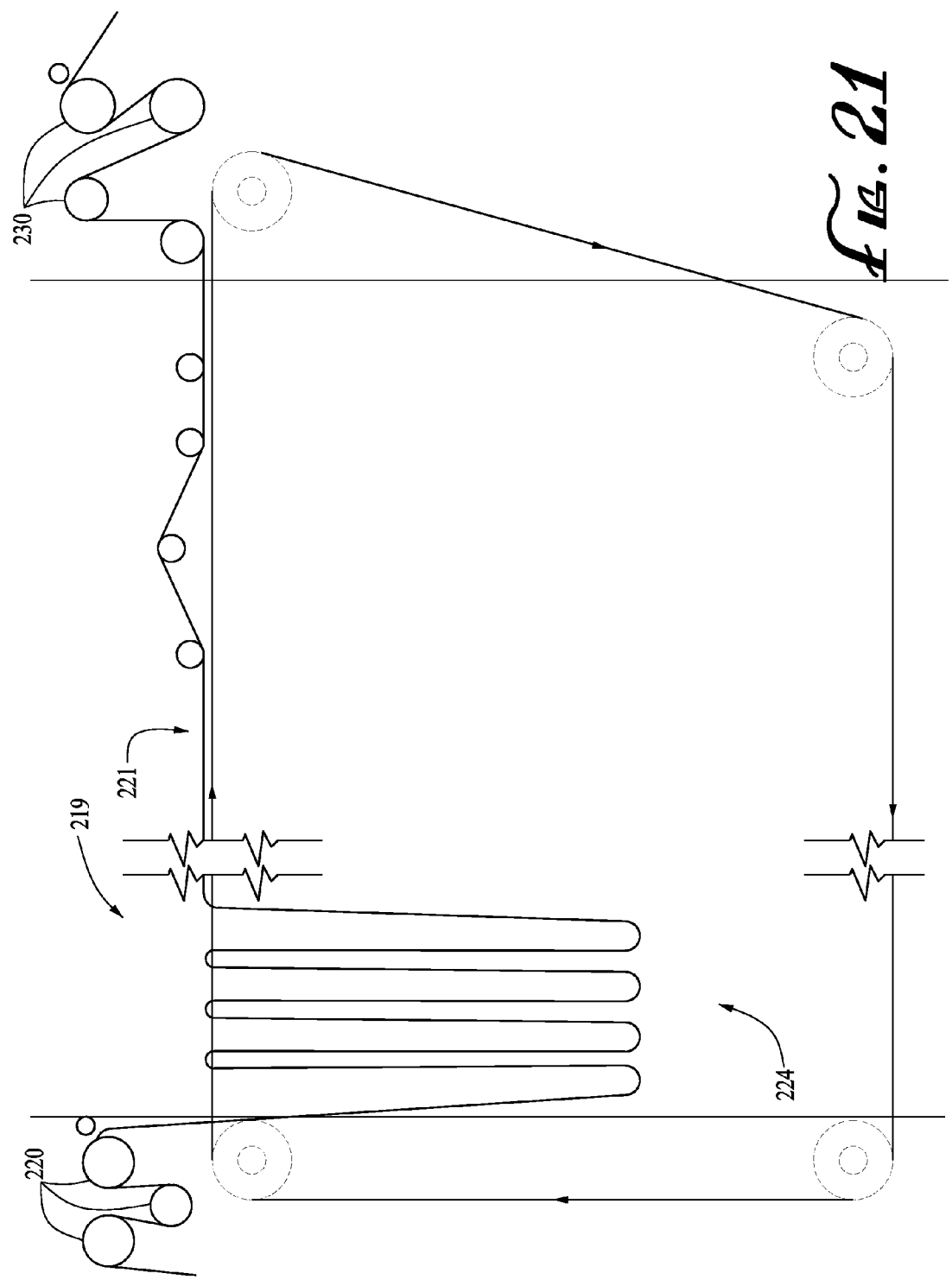
FIG. 21 is a detailed schematic diagram of a portion of the preferred manufacturing line.

Next, excess sand is removed by brushes 216 and 218, as shown in FIGS. 8 and 20, and the surfacing sheet is then passed into the finished product looper 219 shown in FIGS. 8 and 21. Several pull rolls 220 pull the surfacing sheet along the line and feed it into the finished product looper. The first or initial part of the looper 219 is an accumulator 224 where the surfacing sheet product is formed into a plurality of hanging loops 221. These loops allow the product to cool and completely cure. The cooling is assisted by cooling fans 226 and 228 as shown in FIG. 8. The plurality of loops aggregate a length of surfacing sheet to permit the winder section, shown in FIG. 22, to complete its function of winding the surfacing sheet into rolls, without having to stop the entire manufacturing line. With reference to FIG. 21, the surfacing sheet, shown at 221, then enters a series of alignment and guide assist rolls, not numbered. At the downstream end of the finished surfacing sheet looper 219 are a series of pull rolls 230 that pull the product from the looper 219 and supply the product to the winder section 232.

Figure 22:
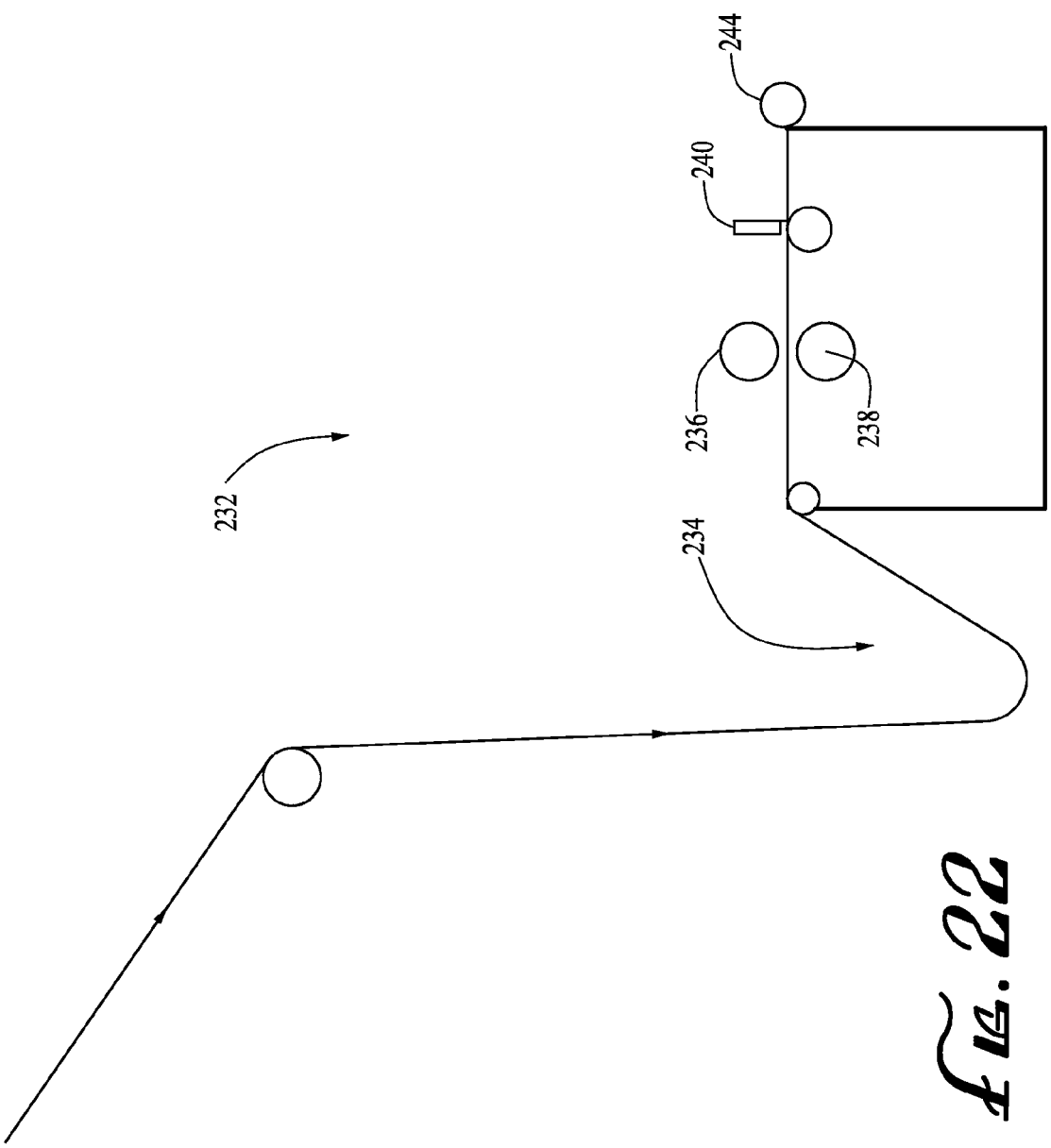
FIG. 22 is a detailed schematic diagram of a portion of the preferred manufacturing line; and, FIG. 23 is a schematic diagram showing a method of making a roofing system using the coated foil surfacing sheets described herein.

Referring to FIGS. 9 and 22 the winder section 232 and its functions are described. The cooled and cured surfacing sheet product is fed to the winder section 232 and is formed into a free loop 234. Winder pull rolls 236 and 238 pull the surfacing sheet product from the free loop 234 in the direction of arrow 235 and feeds it to a knife 240 which cuts the sheet into predetermined lengths. The cut sections are then passed to the mandrel 244 where each cut section is rolled up, and sent to the packaging section of the manufacturing line. In FIG. 10 a plurality of surfacing sheet rolls 246 are shown on a pallet, entering a shrink wrap section 248, where the rolls 246 are wrapped and then become ready for shipping at 250.

Application of the Surfacing Sheets to Form a Roofing System

Figure 23:
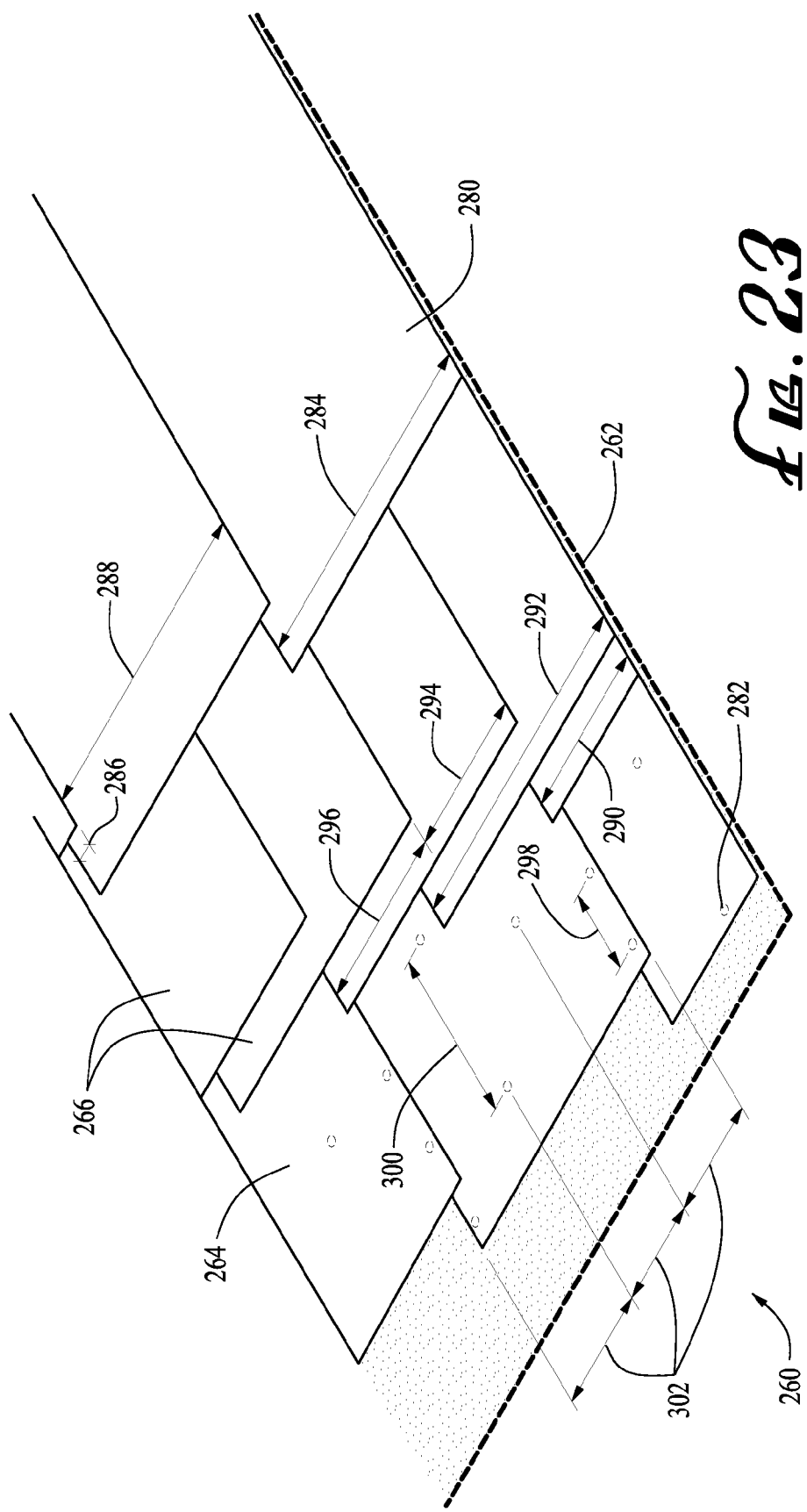

With reference to FIG. 23, a method of making and a finished roofing system for a nailable deck will be described. The finished roofing system 260 includes a deck 262, preferably plywood, a 1-ply layer of CONBASE W-1 IV 264 mechanically fastened to the deck, a 2-ply layer of CONPLY A-IV 266 set into roofing asphalt, and one layer of the coated, preferably reinforced surfacing sheet 280 described herein set into roofing asphalt.

The roof deck is to be firm, clean, dry and smooth. Plywood sheathing is supported on all edges and properly nailed. Ply chips are not permitted and cross blocking is allowed. Cant strips are nailed to the deck with proper length mechanical fasteners preferably placed 12-inches on center, shown at 302. Then CONBASE W-IV base sheet, or the equivalent, is applied at right angles to the continuous joints of the surface to be roofed. The base sheet is lapped 2-inches on sides and 6-inches on the ends. They are lapped so the flow of water is over or parallel to, but not against the laps. The laps extend two inches above the top of the cant strip at the base of the walls and vertical surfaces. Then mechanically fasten 9-inch off center, shown at 298 on the laps and stagger two rows, 18-inches off center, shown at 300, at a 12-inch distance from each edge. Alternate mechanically fastened with approved tape/stable methods of attachment. Rows of tape are to be 12-inches off center. Staple spacing is to comply with the manufacturer's requirements.

Next, embed two plies of CONPLY A-IV or the equivalent in shingle fashion, lapping 19-inches, shown at 296, with a 17-inch exposure, shown at 294. The CONPLY A-IV is to be lapped so the flow of water is over or parallel to, but never against, the laps. All end laps shall be at least 4-inches and adjacent end laps are to be at least 12-inches apart. The full width of each sheet is embedded in hot asphalt at a rate of about 30 pounds per 100 square feet of roof area. Each ply should be lightly broomed, using a moderately soft commercial push broom, as it is applied. All plies are to extend 2-inches above the top of the cant strip, and solidly adhered. Buckles or fishmouths are cut and repaired. Arrow 300 represents a distance of 18 inches, arrow 290 represents a distance of 24 inches and arrows 292 and 284 represent a distance of 36 inches. A typical, 1-inch head fastener is shown at 282. Arrow 288 represents a distance of 34 inches.

Valleys and waterways receive an extra layer of CONPLY A-IV, which preferably is at least 36-inches wide. This ply should extend at least 8-inches up inclines out of valleys. This ply should be laid on top of the base sheet prior to application of other plies. This ply should be embedded in its full width in a uniform mopping of hot asphalt applied at the nominal rate of about 30 pounds per 100 square feet of roof area.

Surfacing sheets described herein may be rolled out into hot asphalt, or may be cut into 12 to 18-foot lengths and preferably are allowed to flatten. They are then applied in parallel to the underlying roofing. They are to be lapped, preferably 2-inches on the sides, shown at 286 and 6-inches at the ends. Adjacent end laps are preferably staggered at least 3-feet apart. The sheets are lapped so that the flow of water is over or parallel to but never against the laps. The full width of each 12-18 foot length is embedded into a uniform solid mopping of hot asphalt applied at a nominal or preferable rate of about 25 pounds per 100 square feet of roof area. Complete contact between the surfacing sheet and the mopping asphalt should be established and maintained during the application process.

On slopes exceeding 1 and ½ inches per foot, all roofing should be applied parallel to the deck. On slopes 2-inches per foot and greater, the ply sheets and surfacing sheets should be back-nailed to the deck in accordance with publically available "General Requirements" published by Consolidate Fiber Glass Products Company, 3801 Standard Street, Bakersfield, Calif., 93308.

Although specific embodiments of the invention have been described, various modifications, alterations, alternative constructions, and equivalents are also encompassed within the scope of the invention.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A built-up roofing surfacing sheet comprising:
   an asphalt-impregnated fiberglass mat having a top side and a bottom side;
   an aluminum foil having a bottom side and a top side;
   a paper layer positioned between the mat top side and the aluminum foil bottom side; and,
   a white resin coating adhered to the aluminum foil top side.

2. A built-up roofing surfacing product consisting essentially of
   an asphalt-impregnated, non-woven fiberglass mat having a first side and a second side;
   an aluminum foil having a first side and a second side, said aluminum foil first side adhered to said fiberglass mat first side;
   a white resin coating adhered to said aluminum foil second side to form a multi-layer sheet; and,
   said multi-layer sheet formed into a roll.

3. The product of claim 2 further comprising a sand coating on said fiberglass mat second side.

4. The product of claim 2 further comprising wet chop fiberglass reinforcements included in said fiberglass mat.

5. The product of claim 2 wherein said fiberglass mat is impregnated with air-blown asphalt.

6. The product of claim 2 further comprising a polymeric film positioned between said aluminum second side and said white resin coating.

7. A built-up roofing surfacing product comprising
   an asphalt-impregnated, non-woven fiberglass mat having a first side and a second side;
   an aluminum foil having a first side and a second side, said aluminum foil first side adhered to said fiberglass mat first side;
   a white resin coating adhered to said aluminum foil second side to form a multi-layer sheet;
   said multi-layer sheet formed into a roll; and
   further comprising a sheet of paper positioned between said aluminum first side and said fiberglass mat first side.

8. The product of claim 2 wherein said roll is a two square roll.

9. The product of claim 2 wherein said roll weighs between 15-45 pounds.

10. The product of claim 2 wherein said roll weighs between 30-90 pounds.

11. The product of claim 2 wherein said asphalt-impregnated fiberglass mat is impregnated with filled asphalt having up to about 70% by weight limestone.

12. A method of making built-up roofing surfacing sheet product comprising
   impregnating a non-woven fiberglass mat with filled, air blown asphalt to form an asphalt-impregnated fiberglass mat having a first side and a second side;
   providing an aluminum foil having a first side, a second side and a white, resin coating on the aluminum foil first side to form a white resin-coated aluminum foil;
   adhering said white resin-coated aluminum foil second side to said asphalt-impregnated fiberglass mat first side; and,
   impregnating said asphalt-impregnated mat second side with sand.

13. The method of claim 12 wherein said impregnating said fiberglass mat comprising impregnating with filled asphalt having up to about 70% by weight limestone.

* * * * *

(12) INTER PARTES REEXAMINATION CERTIFICATE (908th)
United States Patent
Thomas et al.

(10) Number: US 7,923,108 C1
(45) Certificate Issued: *Jul. 15, 2014

(54) BUILT-UP ROOFING SURFACING SHEETS AND METHODS OF MANUFACTURE

(75) Inventors: Daron J. Thomas, Bakersfield, CA (US); Randy Raines, Bakersfield, CA (US); John Hinds, Bakersfield, CA (US)

(73) Assignee: Consolidated Fiberglass Products Company, Bakersfield, CA (US)

Reexamination Request:
No. 95/002,334, Sep. 14, 2012

Reexamination Certificate for:
Patent No.: 7,923,108
Issued: Apr. 12, 2011
Appl. No.: 12/464,717
Filed: May 12, 2009

( * ) Notice: This patent is subject to a terminal disclaimer.

Related U.S. Application Data

(60) Provisional application No. 61/052,440, filed on May 12, 2008, provisional application No. 61/087,587, filed on Aug. 8, 2008.

(51) Int. Cl.
*B32B 17/02* (2006.01)
*B32B 37/00* (2006.01)
*B32B 15/09* (2006.01)
*B32B 17/10* (2006.01)
*B32B 15/12* (2006.01)
*B32B 11/02* (2006.01)
*E04D 5/10* (2006.01)

(52) U.S. Cl.
CPC .. *B32B 11/02* (2013.01); *E04D 5/10* (2013.01)
USPC ........... 428/336; 428/334; 428/335; 428/339; 428/340; 428/430; 428/458; 156/310

(58) Field of Classification Search
None
See application file for complete search history.

(56) References Cited

To view the complete listing of prior art documents cited during the proceeding for Reexamination Control Number 95/002,334, please refer to the USPTO's public Patent Application Information Retrieval (PAIR) system under the Display References tab.

*Primary Examiner* — Norca L Torres Velazquez

(57) ABSTRACT

Built-up roofing surfacing sheets that include a white, resin coated aluminum foil adhered to one side of an asphalt-impregnated fiberglass mat and sand adhered to the other side of the asphalt-impregnated fiberglass mat, the surfacing sheet being compliant with the requirements of California Code of Regulations, Title 24 in effect as of Sep. 11, 2006, and methods of manufacturing the built-up roofing surfacing sheets.

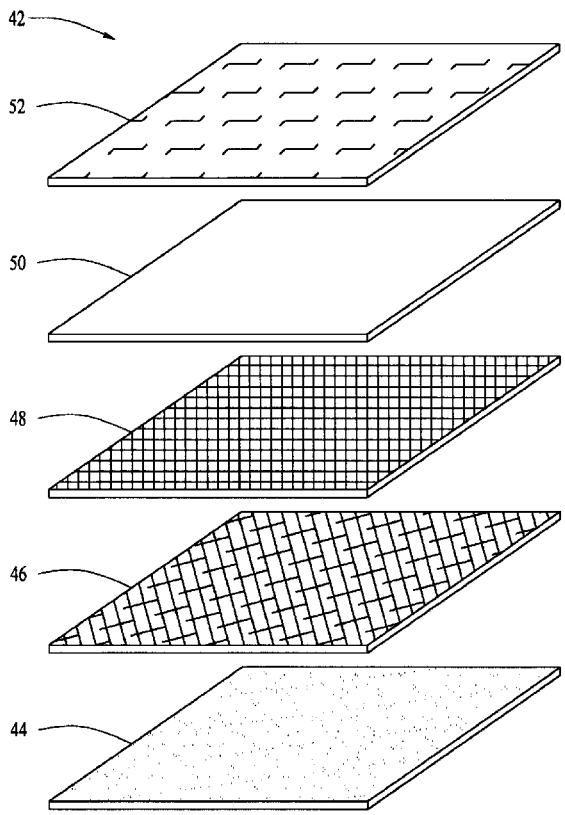

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 2-6 and 10-13 are cancelled.

Claims 1 and 7-9 were not reexamined.

\* \* \* \* \*